(12) United States Patent
Vankayala et al.

(10) Patent No.: US 11,196,502 B2
(45) Date of Patent: Dec. 7, 2021

(54) METHODS AND SYSTEMS FOR DETECTING PRIMARY SYNCHRONIZATION SIGNAL (PSS) IN A WIRELESS NETWORK

(71) Applicant: Samsung Electronics Co., Ltd., Gyeonggi-do (KR)

(72) Inventors: Satya Kumar Vankayala, Bangalore (IN); Javed Akhtar, Bangalore (IN); Abhay Kumar Sah, Bangalore (IN); Anshuman Nigam, Bangalore (IN); Godavarti Satya Venkata Uma Kishore, Bangalore (IN); Nithin Srinivasan, Bangalore (IN); Raviteja Gundeti, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/837,396

(22) Filed: Apr. 1, 2020

(65) Prior Publication Data

US 2020/0313783 A1    Oct. 1, 2020

(30) Foreign Application Priority Data

Apr. 1, 2019  (IN) .............................. 201941013045
Mar. 26, 2020  (IN) ....................... 201941013045 CS

(51) Int. Cl.
*H04J 11/00*    (2006.01)
*H04L 27/26*    (2006.01)
(Continued)

(52) U.S. Cl.
CPC ........ *H04J 11/0073* (2013.01); *H04B 17/336* (2015.01); *H04L 1/0026* (2013.01); *H04L 27/2663* (2013.01)

(58) Field of Classification Search
CPC ................... H04J 11/0073; H04L 27/2663; H04L 1/0026; H04B 17/336
See application file for complete search history.

(56) References Cited

U.S. PATENT DOCUMENTS 9,986,521 B1 * 5/2018 Xiao .................... H04J 11/0076
10,200,961 B2  2/2019 Vos et al.
(Continued)

OTHER PUBLICATIONS

Xiumei Yang at al., "PSS Based Time Synchronization for 3GPP LTE Downlink Receivers", IEEE 13th Internatioanl Conference on Communication Technology, May 8, 2015, 5 pages.
(Continued)

*Primary Examiner* — Harry H Kim
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). Methods and devices are provided for detecting a synchronized primary synchronization signal (PSS) sequence in a wireless network is provided. A device receives a synchronization signal including a PSS sequence. The device determines a plurality of peak correlation values by correlating a plurality of predefined PSS sequences with time-shifted variants of the received synchronization signal. The device detects the synchronized PSS sequence from the plurality of predefined PSS sequences by analyzing the plurality of peak correlation values using at least one of probability detection values, a sliding window method, weight assignments, and a rewarding-based method.

18 Claims, 21 Drawing Sheets

(51) Int. Cl.
*H04B 17/336* (2015.01)
*H04L 1/00* (2006.01)

(56) References Cited

U.S. PATENT DOCUMENTS

| | | |
|---|---|---|
| 10,206,189 B2 | 2/2019 | Lin et al. |
| 10,206,192 B2 | 2/2019 | Kim |
| 2011/0103534 A1 | 5/2011 | Axmon et al. |
| 2013/0273912 A1 | 10/2013 | Xu et al. |
| 2016/0094373 A1* | 3/2016 | Ibrahim ................ H04L 5/0023 375/257 |
| 2017/0054538 A1* | 2/2017 | Pu ........................ H04J 11/0073 |
| 2017/0223648 A1* | 8/2017 | Shin ..................... H04J 11/0073 |
| 2017/0374557 A1 | 12/2017 | Mueck et al. |
| 2018/0184390 A1 | 6/2018 | Wu et al. |

OTHER PUBLICATIONS

International Search Report dated Jul. 21, 2020 issued in counterpart application No. PCT/KR2020/004473, 8 pages.
ITU-T Technical Report, Telecommunication Standardization Sector of ITU, International Telecommunication Union, Feb. 9, 2018, pp. 21.
Abdelmohsen Ali et al., "On the Cell Search and Initial Synchronization for NB-IoT LTE Systems", IEEE Communications Letters, vol. 21, No. 8, Aug. 2017, 4 pages.

* cited by examiner

| Time | Counter value |
|---|---|
| t | counter(0)=0, counter(1)=0, counter(2)=1 |
| t+5 | counter(0)=0, counter(1)=0, counter(2)=1+2 |
| t+10 | counter(0)=0, counter(1)=0, counter(2)=1+2+3 |
| t+15 | counter(0)=0, counter(1)=0, counter(2)=1+2+3+4 |
| t+20 | counter(0)=1, counter(1)=0, counter(2)=1+2+3+4 (Renewal process) |
| t+25 | counter(0)=1+2, counter(1)=0, counter(2)=1+2+3+4 |
| t+30 | counter(0)=1+2, counter(1)=0, counter(2)=1+2+3+4+1 (Renewal process) |
| t+35 | counter(0)=1+2, counter(1)=0, counter(2)=1+2+3+4+1+2 |
| t+40 | counter(0)=0, counter(1)=0, counter(2)=1+2+3+4+1+2+3 |

FIG.6B

| SNR (dB) | Existing approaches | | Probability detection values | | Sliding Window | | Weight assignments | |
| --- | --- | --- | --- | --- | --- | --- | --- | --- |
| | *PSS detected | Time taken (ms) | *PSS detected | Time taken (ms) | *PSS detected | Time taken (ms) | *PSS detected | Time taken (ms) |
| -20 | 0 | 900 | 1 | 900 | 0 | 900 | 0 | 900 |
| -18 | 0 | 900 | 1 | 900 | 0 | 900 | 0 | 900 |
| -16 | 0 | 900 | 1 | 900 | 1 | 900 | 1 | 546 |
| -14 | 0 | 900 | 1 | 900 | 1 | 141 | 1 | 56 |
| -12 | 0 | 900 | 1 | 900 | 1 | 121 | 1 | 31 |
| -10 | 1 | 126 | 1 | 46 | 1 | 121 | 1 | 31 |
| -8 | 1 | 121 | 1 | 46 | 1 | 121 | 1 | 31 |
| -6 | 1 | 121 | 1 | 46 | 1 | 121 | 1 | 31 |
| -4 | 1 | 121 | 1 | 46 | 1 | 121 | 1 | 31 |
| -2 | 1 | 121 | 1 | 46 | 1 | 121 | 1 | 31 |
| 0 | 1 | 121 | 1 | 46 | 1 | 121 | 1 | 31 |
| 2 | 1 | 121 | 1 | 46 | 1 | 121 | 1 | 31 |
| 4 | 1 | 121 | 1 | 46 | 1 | 121 | 1 | 31 |
| 6 | 1 | 121 | 1 | 46 | 1 | 121 | 1 | 31 |
| 8 | 1 | 121 | 1 | 46 | 1 | 121 | 1 | 31 |
| 10 | 1 | 121 | 1 | 46 | 1 | 121 | 1 | 31 |
| | | max_TTI=900 | | max_TTI=900 | | max_TTI=900 | | max_TTI=900 |

FIG. 8

METHODS AND SYSTEMS FOR DETECTING PRIMARY SYNCHRONIZATION SIGNAL (PSS) IN A WIRELESS NETWORK

CROSS REFERENCE TO RELATED APPLICATION(S)

This application is based on and derives the benefit under 35 USC § 119 to Indian Provisional Application No. 201941013045 (PS) and Indian Complete Application No. 201941013045 (CS) as filed on Apr. 1, 2019 and Mar. 26, 2020, respectively, the contents of which are incorporated herein by reference.

BACKGROUND

1. Field

The present disclosure relates to wireless networks, and more particularly to the faster detection of a primary synchronization signal (PSS) in a wireless network.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In wireless networks, a User Equipment (UE) synchronizes with at least one Base Station (BS) (in terms of both time and frequency domains) for establishing reliable communication with the at least one BS. The UE performs a cell search and detects a cell ID of the at least one BS for synchronizing with the at least one BS. The at least one BS can broadcast signals to facilitate the cell search on the UE, wherein the signals may include Primary Synchronization Signals (PSSs) and Secondary Synchronization Signals (SSSs).

For detecting the PSS, the UE receives the signals that have been broadcasted by the at least one BS and converts the received signals to digitized samples. The UE further decimates the digitized samples and correlates the decimated samples with a plurality of locally generated PSS sequences. The UE derives a peak value from the correlation of the decimated samples with each locally generated PSS sequence and compares the derived peak value with a pre-determined threshold. The UE increments a counter of each locally generated PSS sequence, if the corresponding peak value crosses a pre-determined threshold. The counter associated with each locally generated PSS sequence depicts a number of occurrences of the PSS with respect to each locally generated PSS sequence. After performing the correlation of the decimated samples with the plurality of locally generated PSS sequences, the UE checks if any one of the counters associated with the plurality of locally generated PSS sequences crosses a pre-defined threshold limit within a pre-defined time. If any one of the counters crosses the pre-defined threshold limit within the pre-defined time, the UE detects the corresponding locally generated PSS sequence as the PSS, that has been broadcasted by the at least one BS. If none of the counters associated with the plurality of locally generated PSS sequences cross the pre-defined threshold limit within the pre-determined time, the UE may start the above said PSS detection process again afresh. Thus, the UE may consume more time to detect the PSS, which further results in high latency.

SUMMARY

According to an embodiment, a method for detecting a synchronized PSS sequence in a wireless network is provided. A device receives a synchronization signal including a PSS sequence. The device determines a plurality of peak correlation values by correlating a plurality of predefined PSS sequences with time-shifted variants of the received synchronization signal. The device detects the synchronized PSS sequence from the plurality of predefined PSS sequences by analyzing the plurality of peak correlation values using at least one of probability detection values, a sliding window method, weight assignments, and a rewarding-based method.

According to an embodiment, a method is provided to detect a synchronized PSS sequence in a device. A synchronized signal including a PSS sequence is received. A plurality of peak correlation values is determined by correlating a plurality of predefined PSS sequences with time-shifted variants of the received synchronization signal. A maximum peak correlation value is determined corresponding to a predefined PSS sequence among the plurality of peak correlation values corresponding to the plurality of predefined PSS sequences. A counter value of the PSS sequence is updated, if the maximum peak correlation value is greater than a predefined peak threshold value. The predefined PSS sequence is selected as the synchronized PSS sequence, when the updated counter value is greater than a predefined counter threshold value.

According to an embodiment, a device in a wireless network is provided. The device includes a memory and a processor coupled to the memory. The processor is configured to receive a synchronization signal including a PSS sequence, and determine a plurality of peak correlation values by correlating a plurality of predefined PSS sequences with time-shifted variants of the received synchronization signal. The processor is also configured to detect a synchronized PSS sequence from the plurality of predefined PSS sequences by analyzing the plurality of peak correlation values using at least one of probability detection values, a sliding window method, weight assignments, and a rewarding-based method.

BRIEF DESCRIPTION OF THE DRAWINGS

The above and other aspects, features, and advantages of the disclosure will be more apparent from the following detailed description when taken in conjunction with the accompanying drawings, in which:

FIGS. 6A-6D are diagrams illustrating the detection of the PSS based on a dynamic rewarding based method, according to an embodiment;

FIG. 8 is a table depicting the time consumed for detecting the PSS based on conventional approaches, the probability detection values, the sliding window method, and the weight assignments, according to an embodiment;

DETAILED DESCRIPTION

Figure 1A:
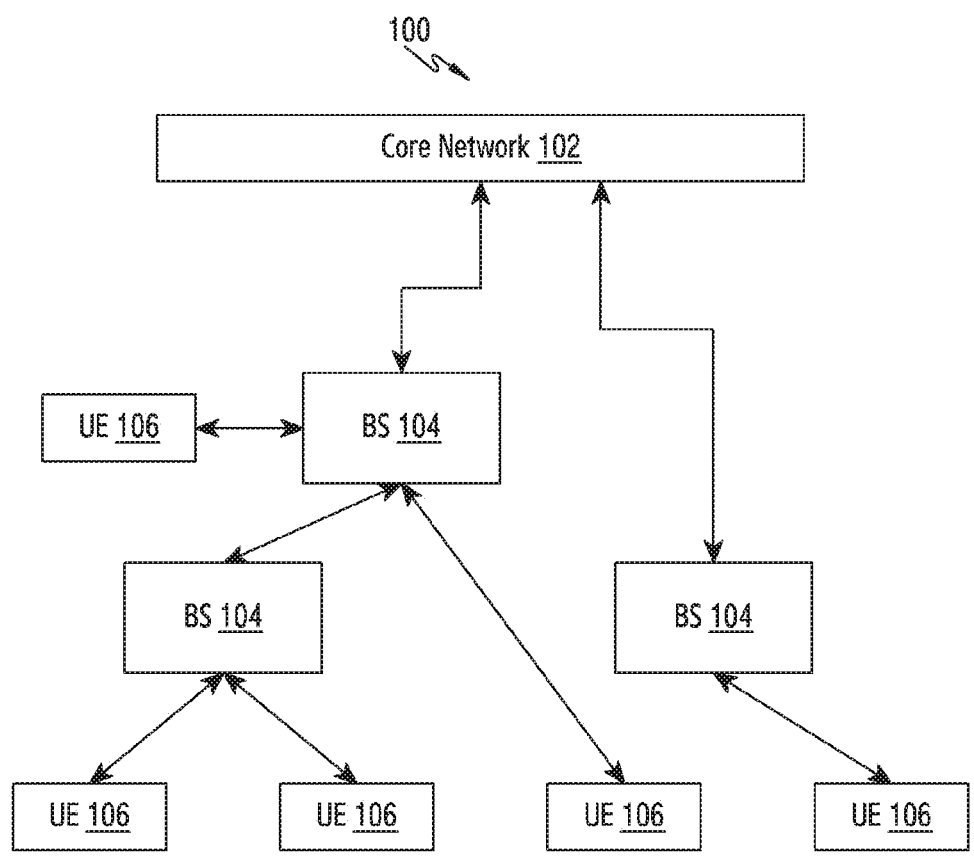
FIGS. 1A and 1B are diagrams illustrating a wireless network, according to an embodiment.

Embodiments of the disclosure are described in detail with reference to the accompanying drawings. The same or similar components may be designated by the same or similar reference numerals although they are illustrated in different drawings.

Embodiments herein describe methods and systems for faster detection of a PSS on a UE.

Embodiments herein describe methods and systems for detecting the PSS using a combination of detected PSS count and probability detection values.

Embodiments herein describe methods and systems for detecting the PSS using a sliding window.

Embodiments herein describe methods and systems for detecting the PSS by assigning at least one weight to the detected PSS count.

Embodiments herein describe methods and systems for detecting the PSS using a dynamic rewarding method.

Figure 1B:
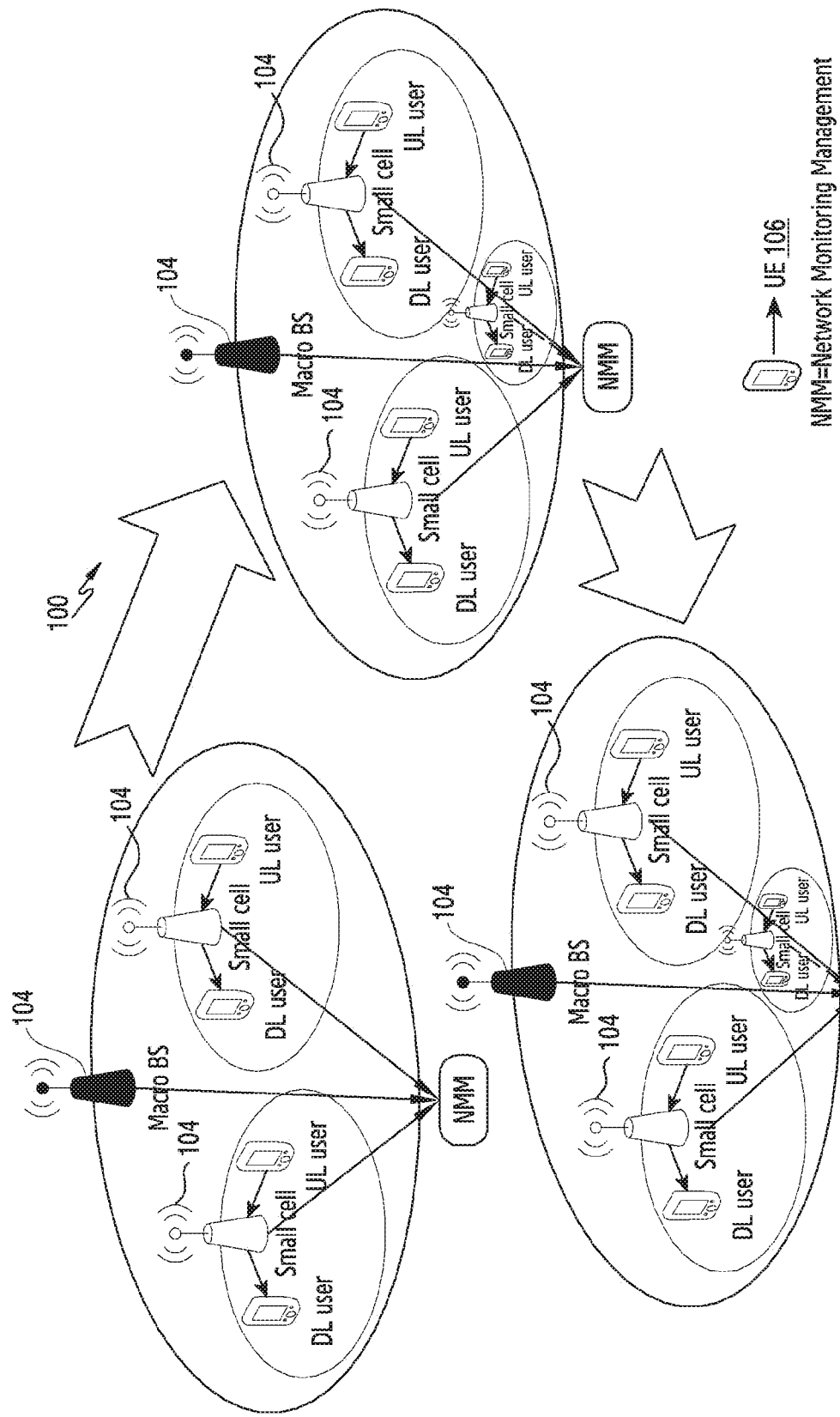

FIGS. 1A and 1B illustrate a wireless network, according to an embodiment. A wireless network 100 referred to herein can be at least one of a 3rd generation partnership project (3GPP) network, a centralized radio access network (RAN) network, a cloud RAN network, a virtualized RAN network, a long term evolution (LTE)/4G network, an LTE advanced (LTE-A) network, a fifth generation/new radio (5G) network, worldwide interoperability for microwave access (WiMAX/IEEE 802.16), Wi-Fi (IEEE 802.11), a 5G based wireless communication system, a 4G based wireless communication system, Wi-Fi Direct, a millimeter wave (mm-Wave) network, a centimeter-wave 5G network, and so on.

The wireless network 100 includes a core network 102, a plurality of base stations (BSs) 104, and a plurality of UEs 106.

The core network 102 can be at least one of an evolved packet core (EPC), a 5G core (5GC), or the like. The core network 102 can be connected to the at least one BS 104. The core network 102 can be configured to connect the at least one UE 106 (that is in connection with the at least one BS 104) to an external data network. Examples of the external data network can be, but is not limited to, the Internet, a packet data network (PDN), an Internet protocol (IP) multimedia core network subsystem, and so on.

The BSs 104 can be connected to the core network 102 and the UEs 106. In an example herein, the BSs 104 can be at least one of a macro cell/BS, a micro BS, a femto BS, a pico-BS, and so on as depicted in FIG. 1B. The BSs 104 can be configured to receive and forward control and data traffic from the connected UEs 106 to the core network 102, which forwards the traffic to the external data network. The BSs 104 broadcasts signals to the UEs 106 present in its region, which can be used by the UEs 106 to synchronize with the BSs 104 for establishing reliable connection with the BSs 104. The signals can be PSSs and SSSs. The PSSs and SSSs carry information about a cell identity (ID) of the BSs 104. The at least one UE 106 detects the PSS and the SSS for identifying the cell ID of the BSs 104 (the cell ID=3*SSS+PSS) and uses the identified cell ID to synchronize with the BSs 104.

The BSs 104 can broadcast the PSSs and the SSSs based on the wireless network 100. Embodiments herein further describe the broadcast of the PSSs by the BSs 104 by considering the LTE/4G network 100 as an example of the wireless network 100. In the LTE network 100, the BSs 104 transmit the two PSSs in one radio frame, having a duration of 10 milliseconds (ms) in frequency division duplex (FDD) and time division duplex (TDD) domains. The radio frame includes two half radio frames, wherein a length/duration of each half radio frame may be 5 ms. The half radio frames may be further divided into five subframes, each having duration of 1 ms. In the FDD domain, each subframe of 1 ms may have 20 slots ranging from 0 to 19. The PSS may be inserted in a last symbol of $0^{th}$ slot and $10^{th}$ Slot of each subframe, and thus, the PSS can be transmitted as a symbol in a specific slot. Similarly, in each subframe of 1 ms, the two SSSs may be inserted before the PSSs. In the TDD domain, each subframe of 1 ms may have 10 slots ranging from 0 to 9. The PSS may be inserted in a slot 2 of the subframe 1 and the SSS may be inserted in the last slot of the subframe 0. Thus, in the LTE network 100, for every 10 ms, the at least one BS 104 broadcasts the radio frames that may carry the PSSs and the SSSs and the UE 106 may detect the two PSSs within 10 ms. Embodiments herein use the terms such as "PSS instances", "radio frames", "PSS duration", "PSS time interval", "PSS instances detected", and so on interchangeably to refer to the signal transmitted by the at least one BS 104 that carries the PSS.

The BSs 104 can be connected to a network monitoring management (NMM) device 108 in a heterogeneous wireless network 100, as illustrated in FIG. 1B. The NMM device 108 can be configured to continuously monitor and manage the BSs 104. When a new small cell/BS is added to the wireless network 100, the NMM device 108 can accommodate the new small cell rapidly and enable the new small cell to identify architecture of the wireless network (i.e. neighbor cells/BSs 104). The NMM device 108 can further configure the new small cell/BS by receiving the signals (the PSSs and the SSSs) that are being broadcasted by the neighbor cells/BSs 104 in the wireless network 100, and detecting the cell identity of the neighbor cells/BSs 104 using the received signals.

The UEs 106 referred to herein can be a device capable of detecting the PSS and the SSS for synchronizing with the at least one BS 104. Examples of the UE 106 can be, but is not limited to, a mobile phone, a smartphone, a tablet, a phablet, a personal digital assistant (PDA), a laptop, a computer, a wearable computing device, a vehicle infotainment device, an Internet of things (IoT) device, a wireless fidelity (Wi-Fi) router, a USB dongle, and so on. The UE 106 can establish the reliable connection with the at least one BS 104 for exchanging the control and data traffic with the external data network. For establishing the reliable connection with the at least one BS 104, the UE 106 synchronizes with the at least one BS 104 both in terms of frequency and time domains. In order to synchronize with the at least one BS 104, the UE 106 performs a cell search and detects the cell ID of the at least one BS 104. The UE 106 detects the cell ID using the PSS and the SSS that are broadcasted by the at least one BS 104. The BS 104 can also receive the signal carrying the PSS from the other BSs and detect the PSS for synchronizing with the other BSs. Embodiments herein further describe the PSS detection procedures on the UE 106, but it should be obvious to a person in the skilled art that same PSS detection procedures can be deployed on the BS 104.

The UE 106 receives the signal carrying the PSS (the PSS instance) from the at least one BS 104. The UE 106 converts the signal into digitized samples and decimates the samples by reducing sample rate of the digitized samples. The UE 106 further generates a plurality of locally generated PSS sequences (according to the 3GPP specification). For detecting the PSS, the UE 106 correlates the decimated samples with the plurality of locally generated PSS sequences and detects one of the plurality of locally generated PSS sequence as the PSS by analyzing an output (for example: a plurality of peak values) derived from the correlation of the decimated samples with the locally generated PSS sequences. The detection of the PSS relies on its distributed decisions of several time instances. The UE 106 can detect the PSS using at least one method that involves a combination of the distributed decisions based on their timeliness and frequency.

The UE 106 may detect/decode the PSS by analyzing the peak values derived from the correlation of the decimated samples with the locally generated PSS sequences based on probability detection values. The probability detection values can be values that depict a threshold of frequency of occurrence of the PSS. The probability detection values can be determined based on the at least one parameter and using at least one learning method. Examples of the at least one parameter can be, but are not limited to, signal-to-interference plus noise ratio (SINR), noise variance, average interference, UE distribution, quality of service (QoS) requirement, estimated interference, average channel quality indicator (CQI) information, instantaneous CQI information, availability of resources on the UE 106 (for example: computing power, system load, or the like), bandwidth, signal to noise ratio (SNR), performance requirements, and so on. Examples of the at least one learning method can be, but not limited to, a machine learning method, a deep learning method, an Artificial Intelligence method, a reinforcement learning method, and so on.

The UE 106 may detect the PSS by analyzing the peak values derived from the correlation of the decimated samples with the locally generated PSS sequences using a sliding window method. The UE 106 defines a sliding size and its respective size value. The sliding window can be a window of the received PSS instances. The UE 106 checks if the PSS has been detected in the defined size value of the sliding window. If the PSS has not been detected in the defined size value of the sliding window, the UE 106 recursively shifts the sliding window by discarding a first PSS instance of the received PSS instance, and checks if the PSS has been detected till the PSS has been detected.

The UE 106 may detect the PSS by analyzing the peak values derived from the correlation of the decimated samples with the locally generated PSS sequences based on weight assignments. The UE 106 detects the PSS count by analyzing the derived peak values, and assigns non-binary real weights instead of '0' and '1' for each detected PSS count. The UE 106 assigns the weights based on at least one of multiple threshold criteria, previous assigned weights, a function of sequence of the previous weights, and so on.

The UE 106 may detect the PSS by analyzing the peak values derived from the correlation of the decimated samples with the locally generated PSS sequences based on a dynamic rewarding method. In accordance with the dynamic rewarding method, the UE 106 by analyzing the derived peak values, and updates a count of occurrence of the PSS/at least one weight for each PSS detection based on a reliability theory and renewal process. The updating the count/at least one weight involves increasing the count/at least one weight based on previous state/weight/count if a sequence of PSS detection is same/continuous for each PSS instance. If the sequence of PSS detection discontinues, then the UE 106 renews the count/at least one weight.

The detection of the PSS based on at least one of the probability detection values, the sliding window method, the weight assignments, and the dynamic rewarding method reduces complexity involved in detecting the PSS on the UE 106, which may further result in reduced time consumption and latency. In addition, the UE 106 may detect the PSS at low SINR.

FIGS. 1A and 1B show elements of the wireless network 100, but it is to be understood that other embodiments are not limited thereon. In other embodiments, the wireless network 100 may include fewer or more elements/units. Further, the labels or names of the units are used only for illustrative purposes, and does not limit the scope of the embodiments herein. One or more units can be combined together to perform the same or substantially similar function in the wireless network 100.

Figure 2:
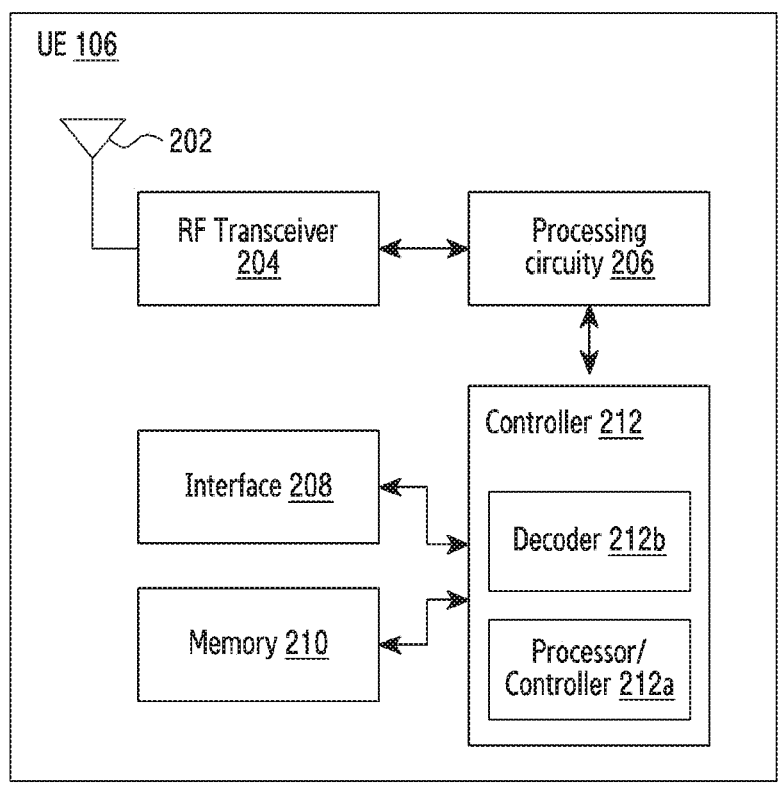
FIGS. 2 and 3 are block diagrams illustrating various components of a UE for detecting a PSS, according to an embodiment.
Figure 3:
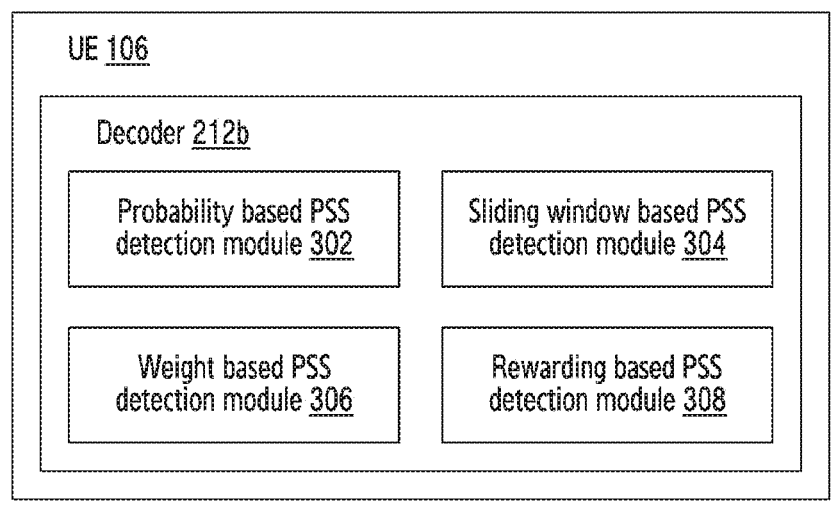

FIGS. 2 and 3 are block diagrams illustrating various components of the UE for detecting the PSS, according to embodiment. The UE 106 includes an antenna 202, a radio frequency (RF) transceiver 204, processing circuitry 206, an interface 208, a memory 210, and a controller 212.

The antenna 202 can be configured to receive RF signals from the at least one BS 104. The RF signal may be the radio frames carrying the PSS/PSS instances. The antenna 202 provides the received signal to the RF transceiver 204.

The RF transceiver 204 can be configured to generate an intermedia frequency (IF) signal/baseband signal by down converting the received RF signal. The RF transceiver 204 may provide the generated IF signal to the processing circuitry 206.

The processing circuitry 206 can be configured to convert the generated IF signal into digitized samples using an appropriate sampling rate (a function of bandwidth). The processing circuitry 206 further decimates the digitized samples to reduce the sampling rate. Decimating the digitized samples involves filtering the digitized samples and performing a down sampling that involves dividing the filtered digitized samples using a suitable decimation factor. The processing circuitry provides the decimated samples to the controller 212 for decoding the PSS.

The interface 208 can be configured to enable the UE 106 to communicate with the at least one external entity (such as, the at least one BS 104 or the like). Examples of the interface 208 can be at least one of a wired or wireless fronthaul interface, a wired or wireless backhaul interface, or any structure supporting communications over a wired or wireless connection.

The memory 210 can store at least one of the digitized samples, decimated samples, the determined PSS, and the locally generated PSS sequences. The memory 210 may also include code that can be for determining the PSS and controlling operations of the UE 106. The memory 210 may include one or more computer-readable storage media. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In some examples, the memory can be configured to store larger amounts of information than the memory. In certain examples, a non-transitory storage medium may store data that can, over time, change (e.g., in random access memory (RAM) or cache).

The controller 212 includes a processing unit 212a and a decoder 212b. The processing unit 212a can be at least one of a single processor, a plurality of processors, multiple homogeneous or heterogeneous cores, multiple central processing units (CPUs) of different kinds, microcontrollers, special media, and other accelerators. The processing unit 212a can be configured to control operations of the UE 106 by executing the program code stored in the memory 210. The processing unit 212a can be also be configured to detect the cell ID of the at least one BS 104 in order to synchronize with the at least one BS 104. The processing unit 212a receives the extracted PSS and the SSS from the decoder 212b and uses the received PSS and the SSS to detect the cell ID of the at least one BS 104 for synchronizing with the at least one BS 104. The processing unit 212a may detect the cell ID as set forth in Equation (1) below:

$$\text{cell } ID = 3 * SSS + PSS \tag{1}$$

The processing unit 212a may be the decoder 212b, which can perform the intended functions of the decoder 212b (detection of the PSS).

The decoder 212b can be configured to detect the PSS and the SSS from the radio frames that have been broadcasted by the at least one BS 104, which are required for identifying the cell ID of the at least one BS 104. The decoder 212b can detect/decode the SSS from the radio frames that have been broadcasted by the at least one BS 104 according to the 3GPP specification. The decoder 212b can detect/decode the PSS from the radio frames that have been broadcasted by the at least one BS 104 based on at least one of the probability detection values, the sliding window, the weights assignments, and the dynamic rewarding method. The decoder 212b provides the determined PSS and SSS to the processing unit 212a for identifying the cell ID of the at least one BS 104. The decoder 212b also stores the determined PSS and SSS in the memory 210.

The decoder 212b includes a probability based PSS detection module 302, a sliding window based PSS detection module 304, a weight based PSS detection module 306, and a rewarding based PSS detection module 308. The decoder 212b operates one of the modules 302-308 for detecting the PSS based on at least one parameter. Examples of the at least one parameter can be, but is not limited to, SINR, noise variance, average interference, UE distribution, QoS requirement, estimated interference, average CQI information, instantaneous CQI information, availability of resources on the UE 106 (e.g., computing power, system load, or the like), bandwidth, and SNR.

A probability based PSS detection module 302 can be configured to determine the PSS based on the probability detection values. The probability based detection module 302 receives the decimated samples (derived from each PSS instance/half radio frame) from the processing circuitry 206 and generates the plurality of PSS sequences locally, according to the 3GPP specification. The generation of number of the PSS sequences locally depends on the type of the wireless network 100. For example, if the wireless network 100 is the LTE network, the probability based PSS detection module 302 generates three PSS sequences locally. For detecting the PSS sequences, the probability based detection module 302 correlates the decimated samples with each of the plurality of locally generated PSS sequences and derives the plurality of peak values/peak correlation values from the correlation of the decimated samples with each locally generated PSS sequence. The probability based PSS detection module 302 determines the maximum peak value associated with each locally generated PSS sequence. The probability based PSS detection module 302 then determines if the maximum peak value associated with each locally generated PSS is greater than a peak threshold value. The peak threshold value can be a pre-defined optimal value. For example, the peak threshold value can be a function of operating frequency, fading, shadowing, coverage area, traffic conditions, UE distribution, shadowing distribution, interference distribution, short/long term interference conditions, short/long term parameters, Infinite Impulse Response (IIR) average values, or any other parameters, which can be a part of cellular coverage design. The peak threshold value may depend on the hardware components of the UE 106 (the peak threshold value may vary from one UE 106 to another). The peak threshold value may be determined using at least one learning method. Examples of the at least one learning method can be, but are not limited to, a machine learning method, a deep learning method, and an artificial intelligence (AI) method. The probability based PSS detection module 302 can maintain/define separate peak threshold values for each BS based on different frequency operations and different path loss models. The probability based PSS detection module 302 can initialize the peak threshold values with random values, and can vary the peak threshold values, when the peak values obtained with respect to all the locally generated sequences satisfy the defined peak threshold value. For example, the probability based PSS detection module 302 can vary the peak threshold value using Equation (2) below:

$$\text{peak threhsold value} = \text{peak threshold value} + \Delta \qquad (2)$$

where 'Δ' (delta) is a function of a fixed or a floating point system, the 'Δ' may be greater than zero, and the 'Δ' may be chosen as the smallest positive value.

When more than one peak value associated with the more than one locally generated PSS sequences crosses the peak threshold value for 20% of time, the probability based PSS detection module 302 increases the peak threshold value by Δ (delta). The peak threshold value may be increased until meeting the constraint. Initiating and varying of the peak threshold value is described with 20% of acceptance and replace 20% by x %. The value of X can be function of BS type, operating frequency, coverage range, transmit power, and long/short/IIR value of channel/interference factors. The initializing and variations of the peak threshold values may be performed even in the VRAN/CRAN/ORAN/Legacy systems. Further, the probability based PSS detection module 302 can repeat the varying the peak threshold value until the peak threshold value get stabilized. Steps involved in defining the peak threshold value can be:

Step 1: Initializing the peak threshold value as zero. The steps for initialization and varying of the peak threshold values can be performed by each and every BS as a different path loss model and different frequency operation. This is valid for VRAN case as well. The VRAN/CRAN/ORAN may maintain the separate peak threshold value for each and every base station/RF unit.

Step 2: A separate counter can be maintained for each locally generated PSS sequence. The peak threshold value may be updated when all the counters of the locally generated PSS sequence satisfy the peak threshold value using Equation (3) below:

$$\text{Threshold} = \text{Threshold} + \Delta \text{ (Delta)} \qquad (3)$$

where delta>0, delta is a function of fixed or floating point system, and delta is chosen as smallest positive value. If the more than one counter satisfies the threshold for 20% (lets us say) of time, this 20% parameter can be reduced further.

Step 3: The varying of the peak threshold value can be repeated until the peak threshold value is stabilized.

If the obtained peak value is greater than the peak threshold value, the probability based detection module 302 determines that peak value as an occurrence of the PSS and increments a number of occurrences of the PSS with respect to the corresponding locally generated PSS sequence. The probability based detection module 302 can maintain a plurality of sequence counters for the plurality of locally generated PSS sequences to track the associated number of occurrences of the PSS. The probability based detection module 302 increments a sequence counter of each locally generated PSS sequence when the peak value obtained from the correlation of the decimated samples with the corresponding locally generated PSS sequence satisfies the peak threshold value (for example: greater than the peak threshold value). Thus, the probability based detection module 302 can determine the number of occurrences of the PSS with respect to each locally generated PSS sequence by tracking the value of the maintained sequence counter of each locally generated PSS sequence.

After performing the correlation of the decimated samples with each locally generated PSS sequence, the probability based PSS detection module 302 determines a frequency of occurrence of the PSS with respect to each locally generated PSS sequence. The probability based PSS detection module 302 can maintain a plurality of fraction counters for the plurality of locally generated PSS sequences to track the associated frequency of occurrence of the PSS. The probability based PSS detection module 302 computes the value of the fraction counter of each locally generated PSS sequence as a function of the number of occurrences of the PSS with respect to each locally generated PSS sequence (Sequence Counter (K)) and a number of PSS instances/half radio frames detected/PSS duration (y). The value of the fraction counter (Fraction Counter (K)) can be computed as Equation (4) below:

$$\text{Fraction Counter } (K) = \text{Sequence Counter } (K)/y \qquad (4)$$

where, the number of PSS instances detected/PSS duration can be a number of half radio frames/PSS instances checked for detecting the PSS. The value of the fraction counter of each locally generated PSS sequence depicts the frequency of occurrence of the PSS with respect to each locally generated PSS sequence.

After performing the correlation of the decimated samples with all the locally generated PSSs for each detected PSS instance/half radio frame, the probability based PSS detection module 302 identifies the number of PSS instances that have been detected and determines the locally generated PSS sequence having the highest frequency occurrence of the PSS among the plurality of locally generated PSS sequences. The probability based detection module 302 determines the locally generated PSS sequence having the highest frequency occurrence of the PSS based on the value of the associated fraction counter. Thereafter, the probability based PSS detection module 302 compares the number of PSS instances detected with a plurality of time/instance thresholds. The probability based PSS detection module 302 compares the highest frequency occurrence of the PSS associated with the identified locally generated PSS sequence with a plurality of probability detection values. The plurality of time/instance thresholds can be pre-defined, which depicts a certain time interval/PSS instances/PSS duration (e.g., 25). The plurality of probability values can be pre-defined values depicting the threshold of frequency of occurrence of the PSS. The plurality of time/instance thresholds and the plurality of probability detection values can be dependent on each other. If the time/instance threshold is increased, then a probability detection value may be reduced. If the number of PSS instances detected satisfies one of the plurality of time thresholds and the frequency occurrence of the PSS associated with the identified locally generated PSS sequence satisfies one of the plurality of probability detection values, the probability based PSS detection module 302 detects that the identified locally generated PSS as the PSS that has been broadcasted by the at least one BS 104. Thus, if the frequency of occurrence of the PSS is greater than the probability detection value in the certain predefined time interval (depicted by the time/instance threshold), then the probability based PSS detection module 302 determines that the PSS has been detected, which further reduces the time required for detecting the PSS.

If the number of PSS instances detected does not satisfy any of the plurality of time/instance thresholds and/or the highest frequency occurrence of the PSS associated with the identified locally generated PSS sequence does not satisfy any of the plurality of probability detection values, the probability based PSS detection module 302 identifies the locally generated PSS sequence having the highest number of occurrences of the PSS among the plurality of locally generated sequences. The probability based PSS detection module 302 identifies the locally generated PSS sequence having the highest number of occurrences of the PSS by comparing the value of the associated sequence counter with the values of the sequence counters associated with the other locally generated PSS sequences. The probability based PSS detection module 302 compares the number of occurrences of the PSS of the identified locally generated PSS sequence with a counter threshold. The counter threshold can be a pre-defined value depicting a threshold of the number of occurrences of the PSS. If the number of occurrences of the PSS of the identified locally generated PSS sequence satisfies the counter threshold (e.g., if the number of occurrences of the PSS of the identified locally generated PSS sequence is greater than or equal to the counter threshold), the probability based PSS detection module 302 detects that the identified locally generated PSS sequence as the PSS and terminates the detecting process of the PSS.

If the number of occurrences of the PSS of the identified locally generated PSS sequence does not satisfy the counter threshold, the probability based PSS detection module 302 determines if the number of PSS instances detected crosses a PSS duration threshold. The PSS duration threshold can be defined based on a type of the wireless network 100. For example, the probability based PSS detection module 302 defines the PSS duration threshold as 60 when the wireless network 100 is the LTE network. If the number of PSS instances detected crosses the PSS duration threshold, the probability based PSS detection module 302 repeats the above-described steps for detecting the PSS by setting the sequence counters and the fraction counters as zero.

The probability based PSS detection module 302 defines the peak threshold value, the instance/time thresholds, the probability detection values, and the counter threshold based on the at least one parameter and using at least one learning method. Examples of the at least one parameter can be, but are not limited to, SINR, noise variance, average interference, UE distribution, QoS requirement, estimated interference, average CQI information, instantaneous CQI information, availability of resources on the UE 106 (e.g., computing power and system load), bandwidth, SNR, and performance requirements. Examples of the at least one learning method can be, but are not limited to, a machine learning method, a deep learning method, an AI method, and a reinforcement learning method. The probability detects the threshold values (the peak threshold value, the instance/time thresholds, the probability detection values, and the counter threshold) by mapping the at least one current parameter with previously stored plurality of parameters that are associated with a plurality of threshold values using the at least one learning method.

When the probability detection based PSS detection module 302 receives the decimated samples from the processing circuitry for detecting the PSS, the probability based PSS detection module 302 generates the plurality of local PSS sequences. The probability based PSS detection module 302 generates three PSS sequences locally (i.e., a NID(0), a NID(1), and a NID(2)). The probability based PSS detection module 302 defines three sequence counters (a C[0], a C[1], and a C[2]) and three fraction counters for the three locally generated PSS sequences (a fraction_counter[0], a fraction_counter[1], and a fraction_counter[2]). Thereafter, the probability based PSS detection module 302 correlates the decimated samples with each of the three locally generated PSS sequences and obtains the maximum peak value from the correlation for each locally generated PSS sequence. The probability based PSS detection module 302 checks if the obtained maximum peak value associated with the locally generated PSS sequence is greater than the peak threshold value. If the obtained maximum peak value is greater than the peak threshold, the probability based PSS detection module 302 increments the value of the sequence counter (depicting the number of occurrences of the PSS) of the corresponding locally generated PSS sequence by one. Further, the probability based PSS detection module 302 determines the value of the fraction counter (depicting the frequency of occurrence of the PSS) of the corresponding locally generated sequence. For example, if the maximum peak value obtained from the correlation of the decimated samples with the first locally generated PSS sequence (NID(0)) is greater than the peak threshold value, the C[0] associated with the NID(0) can be incremented by one. Further, the value of the fraction_counter[0] associated with the NID(0) can be determined as a function of the sequence counter and the number of the PSS instances detected (fraction_counter[0]=C[0]/y)). Similarly, the probability based PSS detection module 302 correlates the decimated samples with the other two locally generated PSS sequences (NID(1) and NID(2)). The probability based PSS detection module 302 updates the C[1] and the C[2] associated with the NID(1) and the NID(2) respectively, based on the peak value derived from the correlation of the decimated samples with the NID(1) and the NID(2). Further, the probability based PSS detection module 302 updates the fraction_counter[1] and the fraction_counter[2] associated with the NID(1) and the NID(2) based on the C[1], and the C[2] and the number of PSS instances detected.

After performing the correlation of the decimated samples with all three locally generated PSS sequences for each PSS instance, the probability based PSS detection module 302 identifies the locally generated PSS sequence with the highest frequency of occurrence of the PSS/highest value of the fraction counter. The fraction_counter[2] associated with the NID(2) may have the highest value (depicting the highest frequency of occurrence of the PSS with respect to the NID(2)). The probability based PSS detection module 302 compares the number of PSS instances detected with a first time interval/instance threshold (for example; 10) and the fraction_counter[2] associated with the NID(2) with a first probability detection value (for example; 0.8). If the number of PSS instances detected is greater than or equal to 10 and if the fraction_counter[2] associated with the NID(2) is greater than 0.8, the probability based PSS detection module 302 determines the NID(2) as the PSS sequence.

When the value of the fraction_counter[2] associated with the NID(2) is less than 0.8, the probability based PSS detection module 302 compares the number of PSS instances detected with a second instance threshold (for example, 30) and the value of the fraction_counter[2] associated with the NID(2) with a second probability detection value (for example, 0.7). The probability detection value can be decreased by increasing the instance threshold. If the number of PSS instances detected is greater than 10 and lesser than 30 and if the value of the fraction_counter [2] associated with the NID(2) is greater than 0.7, the probability based PSS detection module 302 determines that the NID(2) as the PSS sequence.

Otherwise, the probability based PSS detection module 302 determines the sequence counter (e.g., C[2]) associated with the particular locally generated sequence (e.g., the NID(2)) having the highest value and compares the value of the determined C[2] with the counter threshold (e.g., 25). If the value of the C[2] is greater than or equal to 25, the probability based PSS detection module 302 detects that the NID(2) as the PSS and terminates the process of detecting the PSS. If the value of the C[2] is not greater than or equal to 25 and the number of PSS instances detected is greater than the 60 PSS duration, the probability based detection module 302 starts the process of detecting the PSS by setting the sequence counters and the fraction counters as zero and considering the subsequent decimated samples. Embodiments herein consider probability detection values of 0.8 and 0.7 as examples to detect the PSS, but it may obvious to a person skilled in the art that multiple different probability detection values may be considered.

The sliding window based PSS detection module 304 can be configured to detect the PSS based on the sliding window method. The sliding window based PSS detection module 304 receives the decimated samples (derived PSS instance/ radio frame) from the processing circuitry 206 and generates the plurality of local PSS sequences, according to the 3GPP specification. The sliding window based PSS detection module 304 defines a sliding window and a respective size value for detecting the PSS. The sliding window can be a window including a defined number of PSS instances/half radio frames, wherein the number of PSS instances may be equal to the size of the sliding window. The sliding window based PSS detection module 304 defines the size of the sliding window based on the at least one parameter that is determined using the at least one learning method. Examples of the at least one parameter can be, but are not limited to, SINR, noise variance, average interference, UE distribution, QoS requirement, estimated interference, average CQI information, instantaneous CQI information, availability of resources on the UE 106 (for example: computing power, system load, or the like), bandwidth, SNR, and performance requirements. Examples of the at least one learning method can be, but are not limited to, a machine learning method, a deep learning method, an AI method, and a reinforcement learning method. The size can be 60 ms, then each sliding window may include the 60 PSS instances/half radio frames. Further, the sliding window can include a fixed buffer length based on a first in-first out (FIFO) queuing model. The sliding window can be shifted or adjusted using a suitable existing sliding protocol.

For detecting the PSS, the sliding window based PSS detection module 304 correlates the decimated samples derived from the PSS instances included in the defined size value of the sliding window with each locally generated PSS sequence and obtains the maximum peak value corresponding to each locally generated PSS sequence. The sliding window based PSS detection module 304 checks if the maximum obtained peak value satisfies the peak threshold value (e.g., if the obtained peak value is greater than the peak threshold value). If the obtained maximum peak value satisfies the peak threshold value, the sliding window based PSS detection module 304 observes that as an occurrence of the PSS and increments the number of occurrences of the PSS with respect to the corresponding locally generated PSS sequence. The sliding window based PSS detection module 304 can maintain the plurality of sequence counters for the plurality of locally generated PSS sequences to track the associated number of occurrences of the PSS. The sliding window based PSS detection module 304 increments the sequence counter of each locally generated PSS sequence when the peak value obtained from the correlation of the decimated samples with the corresponding locally generated PSS sequence satisfies the peak threshold. Thus, the sliding window based PSS detection module 304 can determine the number of occurrences of the PSS with respect to each locally generated PSS sequence by tracking the value of the maintained sequence counter of each locally generated PSS sequence.

After performing the correlation of the decimated samples with all the locally generated PSS sequences for each PSS instance included within the defined size of the sliding window (e.g., the 60 PSS instances), the sliding window based PSS detection module 304 identifies the locally generated PSS sequence having the highest number of occurrences of the PSS among the plurality of locally generated PSS sequences. The sliding window based PSS detection module 304 identifies the locally generated PSS sequence having the highest number of occurrences of the PSS based on the value of the associated sequence counter. The sliding window based PSS detection module 304 checks within the defined size of the sliding window, if the highest number of occurrences of the PSS associated with the identified locally generated PSS sequence satisfy with the counter threshold. If the highest number of occurrences of the PSS associated with the identified locally generated PSS sequence satisfies (for example; greater than or equal to) the counter threshold within the size of the sliding window, the sliding window based PSS detection module 304 detects that the identified locally generated PSS as the PSS that has been broadcasted by the at least one BS 104.

If the highest number of occurrences of the PSS associated with the identified locally generated PSS sequence does not satisfy (for example; lesser) the counter threshold within the size of the sliding window, the sliding window based PSS detection module 304 checks if the number of PSS instances detected/size of sliding window satisfy the time/ instance threshold. If the number of PSS instances detected satisfy (for example: greater than or equal to) the time/ instance threshold, the sliding window based PSS detection module 304 recursively shifts/moves/adjusts the sliding window using the existing sliding protocol by discarding a first PSS instance of the defined number of PSS instances included in the sliding window and considering the last defined number of PSS instances starting from a second PSS instance if the PSS has not been detected, performs the correlation of the decimated samples with each locally generated PSS sequence within the shifted sliding window, and checks if the PSS has been detected within the shifted sliding window till the PSS has been detected. Thus, the detection of the PSS using the sliding window method eliminates a need for restarting the process of detecting the PSS when the highest number of occurrences of the PSS associated with the particular locally generated sequence does not cross the counter threshold within the time/instance threshold.

When the sliding window based PSS detection module 304 receives the decimated samples from the processing circuitry 206 for detecting the PSS, the sliding window based PSS detection module 304 generates the plurality of local PSS sequences. Three PSS sequences can be generated locally (i.e., the NID(0), the NID(1), and the NID(2)). The sliding window based PSS detection module 304 further defines the sliding window of size 60 ms as an example herein. The sliding window of size 60 ms depicts the window that may fit with 60 PSS instances/half radio frames. The sliding window based PSS detection module 304 correlates the decimated samples with each of the three locally generated PSS sequences within the defined sliding window size. The sliding window based PSS detection module 304 determines the number of occurrences of the PSS with each locally generated PSS sequence based on the detection of the peak value derived from the correlation of the decimated samples with each locally generated PSS sequence. After performing the correlation of the decimated samples with all the three locally generated PSS sequence for all the PSS instances included within the defined sliding window, the sliding window based PSS detection module 304 identifies the locally generated PSS sequence (e.g., the NID(1)) with the highest number of occurrences of the PSS. The sliding window based PSS detection module 304 compares the number of occurrences of the PSS associated with the NID(2) with the counter threshold (for example: 25) within the defined sliding window size. If the highest number of occurrences of the PSS associated with the NID(1) is greater than 25 within the defined sliding window size, then the sliding window based PSS detection module 304 determines the NID(1) as the PSS.

When the highest number of occurrences of the PSS associated with the NID(1) is less than 25, then the sliding window based PSS detection module 304 shifts the sliding window by discarding the first PSS instance (e.g., the $1^{st}$ of the 60 PSS instances/radio frames) and considers the last 60 PSS instances staring from the $2^{nd}$ to $61^{st}$ PSS instance. The sliding window based PSS detection module 304 further correlates the decimated samples with each locally generated PSS sequence within the shifted window size for detecting the PSS. When the NID(1) has been detected as the PSS within the shifted sliding window, the sliding window based PSS detection module 304 detects the PSS after observing the 61 PSS instances.

The weight based PSS detection module 306 can be configured to detect the PSS based on the weight assignments. The weight based PSS detection module 306 receives the decimated samples from the processing circuitry 206 and generates the plurality of locally generated PSS sequences according to the 3GPP specification. The weight based PSS detection module 306 correlates the decimated samples with each of the plurality of locally generated PSS sequences and obtains the maximum peak value corresponding to each locally generated PSS sequence. The weight based PSS detection module 306 compares the obtained maximum peak value with multiple peak thresholds.

If the obtained maximum peak value corresponding to the one of the locally generated PSS sequence satisfies one of the peak threshold, the weight based PSS detection module 306 assigns the at least one weight to the corresponding locally generated PSS sequence. The weight based PSS detection module 306 defines the weight counters for the plurality of locally generated PSS sequences for tracking the assigned weights for each locally generated PSS sequence. The weight based PSS detection module 306 assigns the at least one weight to each locally generated PSS sequence by assigning the weight to the corresponding weight counter. The at least one weight can be a non-binary real value (e.g., w>0). The weight based PSS detection module 306 assigns the at least one weight to each locally generated PSS sequence based on at least one of the multiple peak threshold values, the previous weights assigned to the corresponding locally generated PSS sequence, a function of the previous weights assigned to the corresponding locally generated PSS sequence, and so on. The at least one weight assigned can be a function of parameters such as, but not limited to, path loss, shadowing, fading, operating frequency, a type of the BS 104, and system (UE) parameters probability statistics. The at least one weight can be assigned based on the obtained peak threshold value. For example, if the obtained peak value (e.g., 10) is much higher than the peak threshold value (e.g., 5), the weight based PSS detection module 306 assigns more weight (e.g., 3). Similarly, if the obtained peak value (e.g., 6) is not much higher than the peak threshold value (e.g., 5), the weight based PSS detection module 306 assigns less weight (e.g., 1).

The weight based PSS detection module 306 identifies the locally generated PSS sequence having the highest weight at a pre-defined time interval/after performing the correlation for a pre-defined number of PSS instances. The weight based PSS detection module 306 compares the at least one weight associated with the identified locally generated PSS sequence with a weight threshold. The weight threshold can be a pre-defined value. The weight threshold can be set as a function of parameters such as, but not limited to, path loss, shadowing, fading, operating frequency, a type of the BS 104, and system (UE) parameters probability statistics. The weight based detection module 306 detects that the identified locally generated PSS as the PSS, which has been broadcasted from the at least one BS 104, if the associated weight satisfies the weight threshold.

When the weight based PSS detection module 306 receives the decimated samples from the processing circuitry 206 for detecting the PSS, the weight based PSS detection module 306 generates the three PSS sequences locally (the NID(0), the NID(1), and the NID(2)). The weight based PSS detection module 306 correlates the decimated samples with each of the three locally generated PSS sequences and checks the peak derived from the multiple peak threshold values for detecting the PSS (in case of deriving multiple peak values due to interference and noise sources). The weight based PSS detection module 306 correlates the decimated samples with the NID(0) and obtains the maximum peak value. The weight based PSS detection module 306 compares the obtained maximum peak value with a first peak threshold value (e.g., 15). When the obtained maximum peak value does not satisfy (e.g., is not greater than the first peak threshold value, the weight based PSS detection module 306 compares the obtained peak value with a second peak threshold value (e.g., 14). When the peak value satisfies the second peak threshold value (e.g., the peak value is greater than the first peak threshold value), the weight based PSS detection module 306 assigns the at least one weight by updating the weight counter associated with the NID(0). The weight based PSS detection module 306 may assign the at least one weight to the NID(0) based on the previous weight assigned to the NID(0). If the previous weight assigned to the NID(0) is 1, then the weight based PSS detection module 306 may assign the current weight to the NID(0) as 2 as an example. After correlating the decimated samples with all three locally generated PSS sequences for the pre-determined number of PSS instances (the pre-defined time interval), the weight based PSS detection module 306 identifies the locally generated PSS sequence (for example, consider herein as the NID(0)) having the highest weight. The weight based PSS detection module 306 checks if the number of PSS instances detected satisfy the time/instance threshold and if the weight of the NID(0) satisfies the pre-determined weight threshold (for example: 25). If the weight of the NID(0) is greater than 25 and the number of PSS instances satisfies the time/instance threshold, the weight based PSS detection module 306 detects the NID(0) as the PSS.

The rewarding based PSS detection module 308 can be configured to detect the PSS based on the dynamic rewarding method. The rewarding based PSS detection module 308 receives the decimated samples from the processing circuitry 206 and generates the plurality of locally generated PSS sequences according to the 3GPP specification. The rewarding based PSS detection module 308 correlates the decimated samples with each of the plurality of locally generated PSS sequences and obtains the maximum peak value corresponding to each of the locally generated PSS sequence. The rewarding based PSS detection module 308 compares the obtained maximum peak value corresponding to each of the locally generated PSS sequence with the peak threshold value. If the obtained maximum peak value of the one of the locally generated PSS sequences satisfies the peak threshold value, the rewarding based PSS detection module 308 observes that the PSS has been detected and updates a count of occurrences of the PSS/weight with respect to the corresponding locally generated PSS sequence. The rewarding based PSS detection module 308 defines index counters for the plurality of locally generated PSS sequences for determining the count of occurrences of the PSS with respect to each locally generated PSS sequence.

The rewarding based PSS detection module 308 updates the count of occurrences of the PSS/value of the index counter of each locally generated PSS sequence based on a reliability and renewal process. The rewarding based PSS detection module 308 updates the value of the index counter/count of occurrences of the PSS associated with each locally generated PSS sequence based on the previous state/value of the index counter, if a sequence of detection of the PSS is continuous with respect to the corresponding locally generated PSS sequence. In such a case, the updated current count of occurrences of the PSS/current value of the index counter of each locally generated PSS sequence may be greater than the previous count/state. If the sequence of detection of the PSS is continuous with the locally generated PSS sequence, then the rewarding based PSS detection module 308 may update the count of occurrences of the PSS of the corresponding locally generated PSS sequence based on a Fibonacci series or using generalized n^k series, where k may be greater than zero.

If the sequence of detection of the PSS discontinues with respect to the locally generated PSS sequence, the rewarding based PSS detection module 308 initiates a renewal process to renew the value (for example: assigning values from 1) of the index counter/counts of occurrences of the PSS associated with each locally generated PSS sequence.

After correlating the decimated samples with all the locally generated PSS sequences for each PSS instance, the rewarding based PSS detection module 308 identifies the locally generated sequence having the highest total count of the occurrences of the PSS/the highest index counter value (a sum of the count of the occurrences of the PSS) among the plurality of locally generated sequences. The rewarding based PSS detection module 308 further checks if the total count of the occurrences of the PSS associated with the identified locally generated PSS sequence satisfies the counter threshold. If the total count of the occurrences of the PSS associated with the identified locally generated PSS sequence satisfies the counter threshold, the rewarding based PSS detection module 308 identifies the identified locally generated PSS sequence as the PSS, which has been broadcasted by the at least one BS 104.

When the rewarding based PSS detection module 308 receives the decimated samples for detecting the PSS, the rewarding based PSS detection module 308 correlates the decimated samples with each of the three locally generated PSS sequences as an example for each detected PSS instance. If the maximum peak value derived from the correlation corresponding one of the locally generated PSS sequences is greater than the peak threshold value, the rewarding based PSS detection module 308 updates the count of occurrences of the PSS associated with each locally generated PSS sequence based on the previous state/count of occurrences of the PSS if the sequence of detection of the PSS continues with the corresponding locally generated PSS sequence. At time 't'/first PSS instance, the rewarding based PSS detection module 308 observes the PSS with respect to the NID(1) and updates the count of occurrences of the PSS with respect to the NID(1) as 1 (e.g., the index counter associated with the NID(1) can be set as 1). At time 't+5 ms'/second PSS instance, the rewarding based PSS detection module 308 observes the PSS with respect to the NID(1). Then the rewarding based PSS detection module 308 updates the count of occurrences of the PSS with respect to the NID(1) based on the previous count associated with the NID(1) (e.g., the index counter associated with the NID(1) can be set as 1+2), since the sequence of detection of the PSS continues with the NID(1). At time 't+10 ms'/third PSS instance, the rewarding based PSS detection module 308 observes the PSS with respect to the NID(2). Then the rewarding based PSS detection module 308 updates the count of occurrences of the PSS with respect to the NID(2) (e.g., the index counter associated with the NID(2) can be updated as 1). At time 't+15 ms'/fourth PSS instance, the rewarding based PSS detection module 308 observes the PSS with respect to the NID(1). Then the rewarding based PSS detection module 308 updates the count of occurrences of the PSS with respect to the NID(1) (e.g., the index counter associated with the NID(1) can be updated as 1+2+1) based on the renewal process, since the sequence of detection of the PSS has been discontinued with the NID(1). Similarly, the rewarding based PSS detection module 308 continues the process of detecting the total count of the occurrences of the PSS associated with any one of the locally generated PSS sequences that satisfies the count threshold. The rewarding based PSS detection module 308 detects the corresponding locally generated PSS sequence as the PSS, that has been broadcasted by the at least one BS 104. When the counter threshold is set as 2, the total count of the occurrences of the PSS associated with the NID(1) may satisfy the counter threshold at the time 't+15 ms'. Thus, the NID(1) may be detected as the PSS.

FIGS. 2 and 3 show units/modules of the UE 106, but it is to be understood that other embodiments are not limited thereon. In other embodiments, the UE 106 may include fewer or more elements/units. Further, the labels or names of the units are used only for illustrative purposes and does not limit the scope of the embodiments herein. One or more units can be combined together to perform the same or substantially similar functions in the UE 106.

Figure 4A:
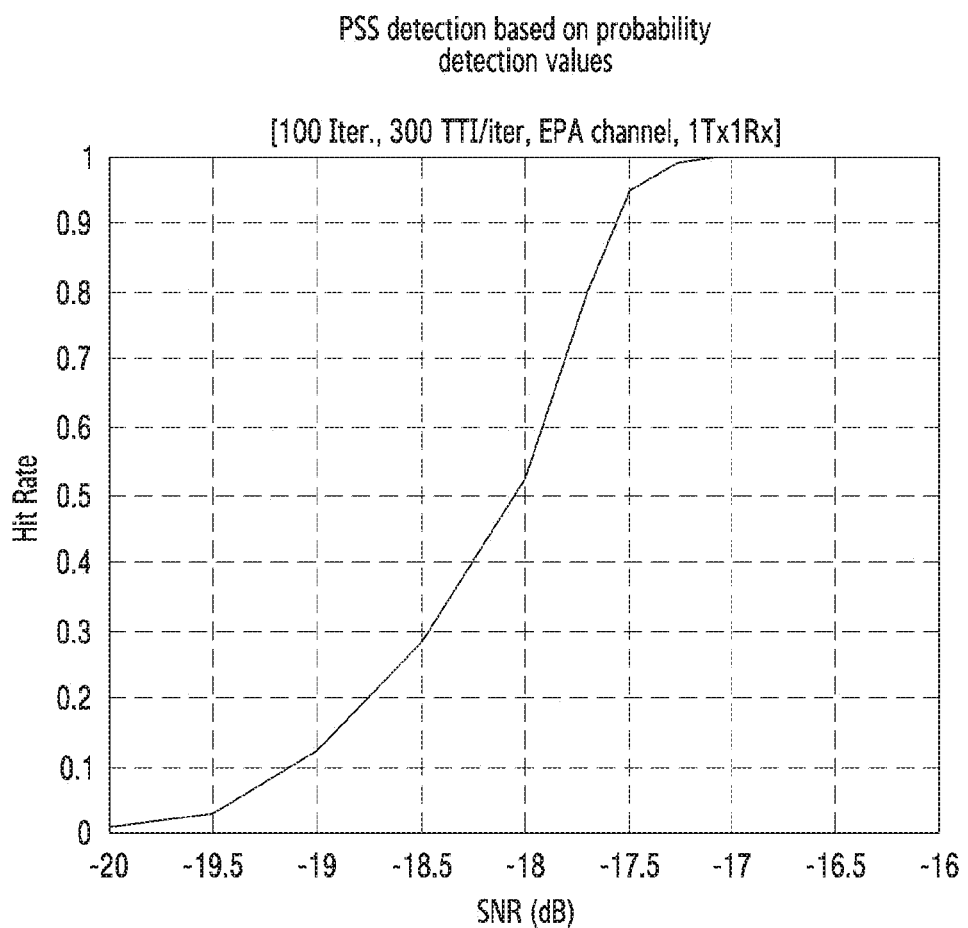
FIGS. 4A and 4B are graphs depicting the time consumed by the UE to detect the PSS based on probability detection values, according to an embodiment.
Figure 4B:
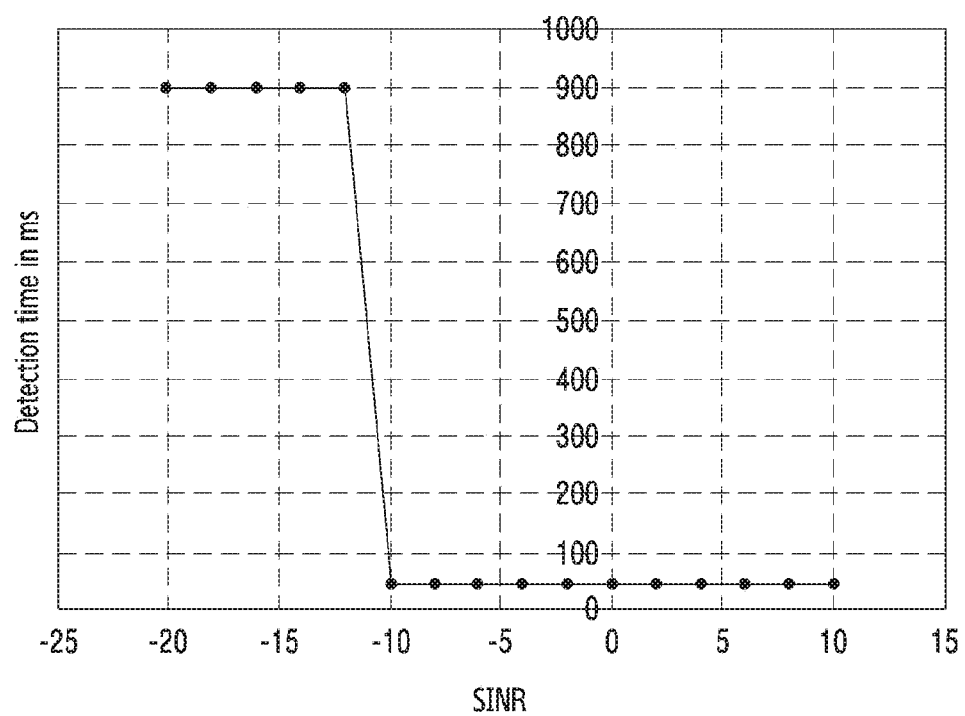

FIGS. 4A and 4B are graphs depicting the time taken to detect the PSS based on the probability detection values, according to an embodiment. Embodiments herein enable the UE 106 to detect the PSS based on the probability detection values. For each PSS instance, the UE 106 performs the correlation of the decimated samples with each of the plurality of locally generated PSS sequences (e.g., the three locally generated PSS sequences as an example) and updates the frequency of occurrence of the PSS with each locally generated PSS sequence based on the peak values derived from the correlation. After performing the correlation for each PSS instance, the UE 106 identifies the locally generated PSS sequence with the highest frequency of occurrence of the PSS. The UE 106 compares the number of PSS instances detected with the multiple instance thresholds and the frequency of occurrence of the PSS associated with the identified locally generated PSS sequence with the multiple probability values. If the frequency of the PSS associated with the identified locally generated PSS sequence with any one of the multiple probability values within any one of the instance threshold, the UE 106 detects the identified locally generated PSS sequence as the PSS. Thus, the time taken for detecting the PSS may be reduced. Based on the probability detection values, the UE 106 can detect the PSS even at low SINR values. The detection of the PSS based on the probability detection values at −17 dB SINR is plotted in an example graph depicted in FIG. 4A. The time consumed for detecting the PSS based on the probability detection values with respect to the SINR values is plotted in the example graph depicted in FIG. 4B. The UE 106 can detect the PSS by consuming 900 ms when the SINR range is between −20 dB to −12 dB. The UE 106 can detect the PSS by consuming 46 ms when the SINR is greater than −12 dB.

Figure 5A:
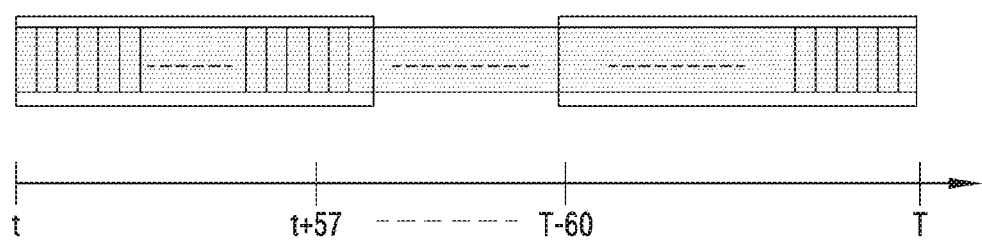
FIGS. 5A-5D are diagrams illustrating the detection of the PSS based on a sliding window method, according to an embodiment.

FIGS. 5A-5D are diagrams illustrating the detection of the PSS based on the sliding window method, according to an embodiment of the disclosure. Embodiments herein enable the UE 106 to define the sliding window for detecting the PSS. The UE 106 determines the size of the sliding window based on the parameters that are determined using the at least one learning method. If the size of sliding window size is 60 ms, then the sliding window may include 60 PSS instances. The UE 106 may dynamically change the size of the sliding window based on the change in values of the at least one parameter. Examples of the at least one parameter can be, but not are limited to, SINR, noise variance, average interference, UE distribution, QoS requirement, estimated interference, average CQI information, instantaneous CQI information, availability of resources on the UE 106 (e.g., computing power, system load, or the like), bandwidth, SNR, and performance requirements. The sliding window of size 60 ms is depicted in FIG. 5A.

Figure 5B:
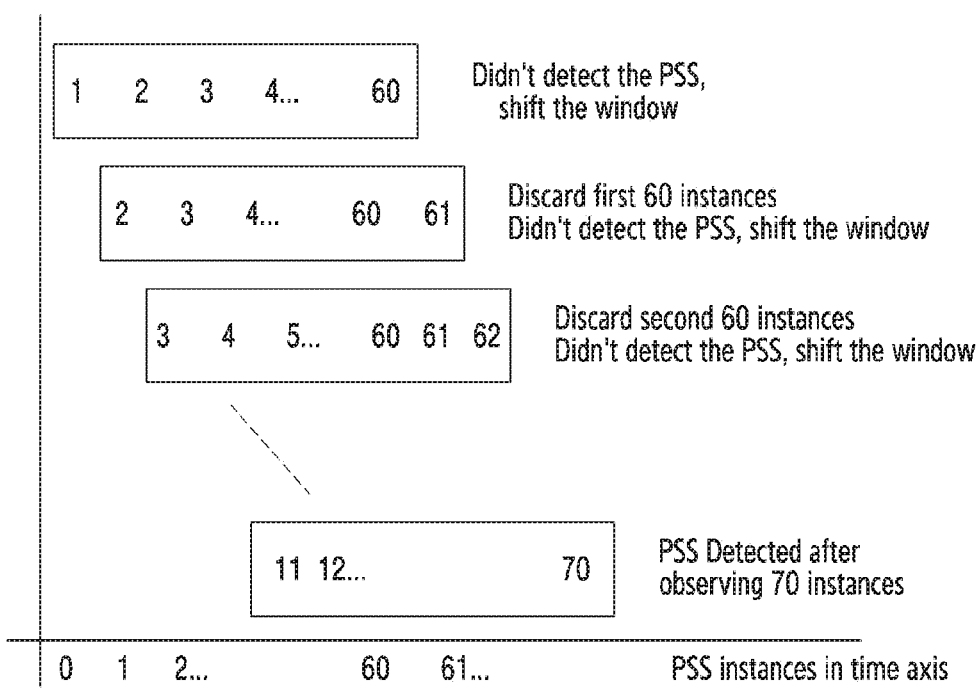
Figure 5C:
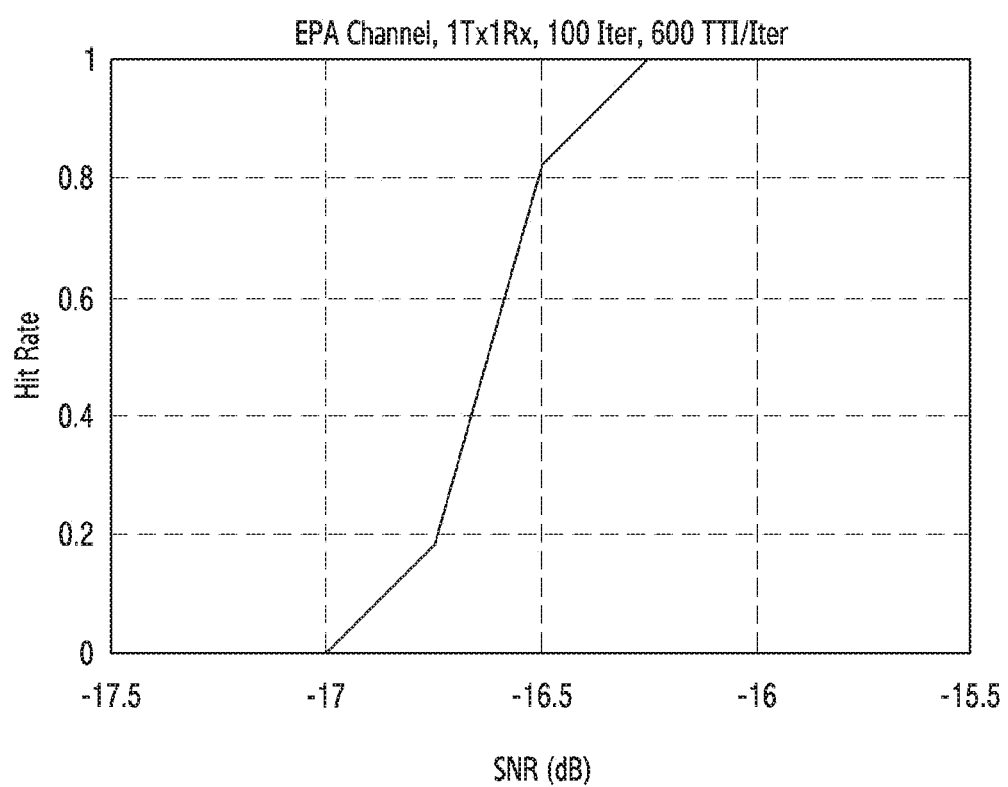

Embodiments herein are further explained considering a sliding window size of 60 ms for detecting the PSS, but it may be obvious to a person skilled in the art that any other size can be considered. Within the sliding window of size 60 ms (for 60 PSS instances), the UE 106 correlates the decimated samples obtained from each of the 60 PSS instances with the three locally generated PSS sequences and determines the number of occurrences of the PSS based on the associated peak value. After performing the correlation for the 60 PSS instances, the UE 106 identifies the locally generated PSS sequence with the highest number of occurrences of the PSS. The UE 106 compares the number of occurrences of the PSS associated with the identified locally generated PSS sequence with the counter threshold. When the number of occurrences of the PSS associated with the identified locally generated PSS sequence does not satisfy the counter threshold, the UE 106 decides that the PSS has not been detected in the defined size of the sliding window (i.e., within the 60 PSS instances). The UE 106 shifts the sliding window by discarding the first PSS instance of the 60 PSS instances and considering the last 60 PSS instances (i.e., from 2nd PSS instance to the 61$^{st}$ PSS instance). The UE 106 checks if the PSS has been detected (by performing the above-described steps of detecting the PSS) within the shifted sliding window. When the PSS has not been detected even within the shifted sliding window, the UE 106 again shifts the window by discarding the first PSS instance (i.e., 2nd PSS instance) and considers the last 60 PSS instances (i.e., from 3$^{rd}$ PSS instance to 62$^{nd}$ PSS instance) and checks if the PSS has been detected. If the PSS has not been detected, the UE 106 recursively shifts the sliding window by discarding the first of the 60 PSS instances included in the sliding window and considering the last 60 samples and checks if the PSS has been detected. When the UE 106 detects the PSS after observing the 70 PSS instances or within the sliding window started from 11$^{th}$ PSS instance to 70$^{th}$ PSS instance as depicted in FIG. 5B, the time consumption for detecting the PSS can be reduced. The UE 106 can also detect the PSS at the low SINR using the sliding window method. The detection of the PSS at the SINR of −17 dB is depicted in FIG. 5C.

Figure 5D:
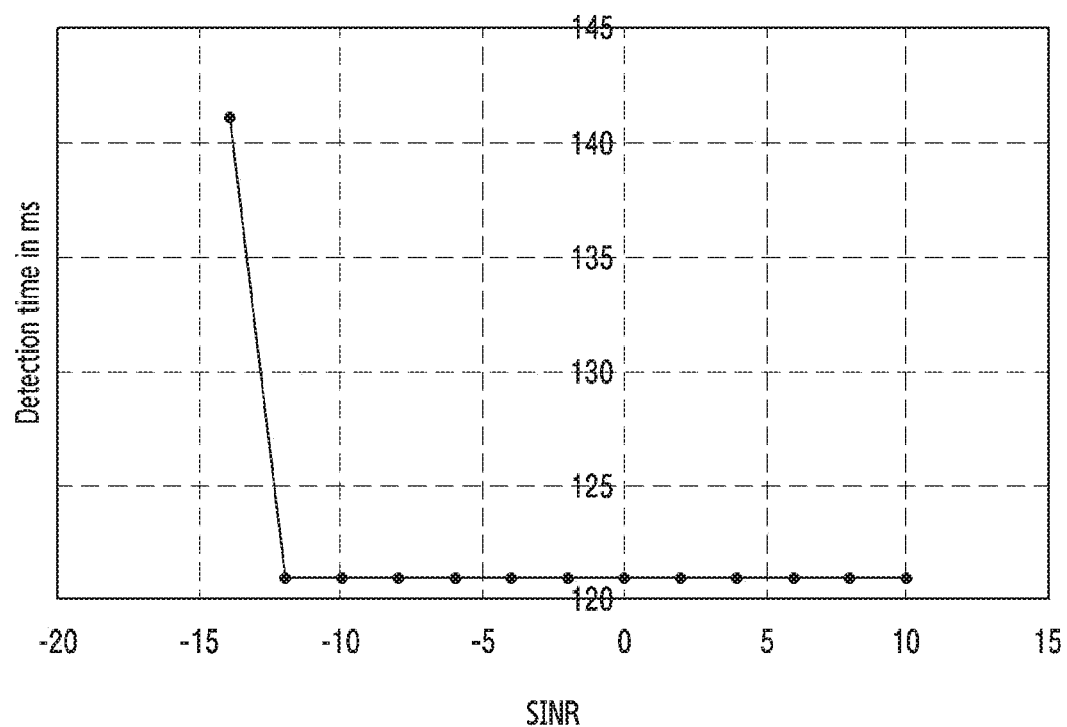

The time consumed by the UE 106 to detect the PSS based on the sliding window method is plotted in a graph depicted in FIG. 5D. The UE 106 can detect the PSS by consuming 900 ms when the SINR range is between −20 dB to −12 dB, The UE 106 can detect the PSS by consuming 46 ms when the SINR is greater than −12 dB.

Figure 6A:
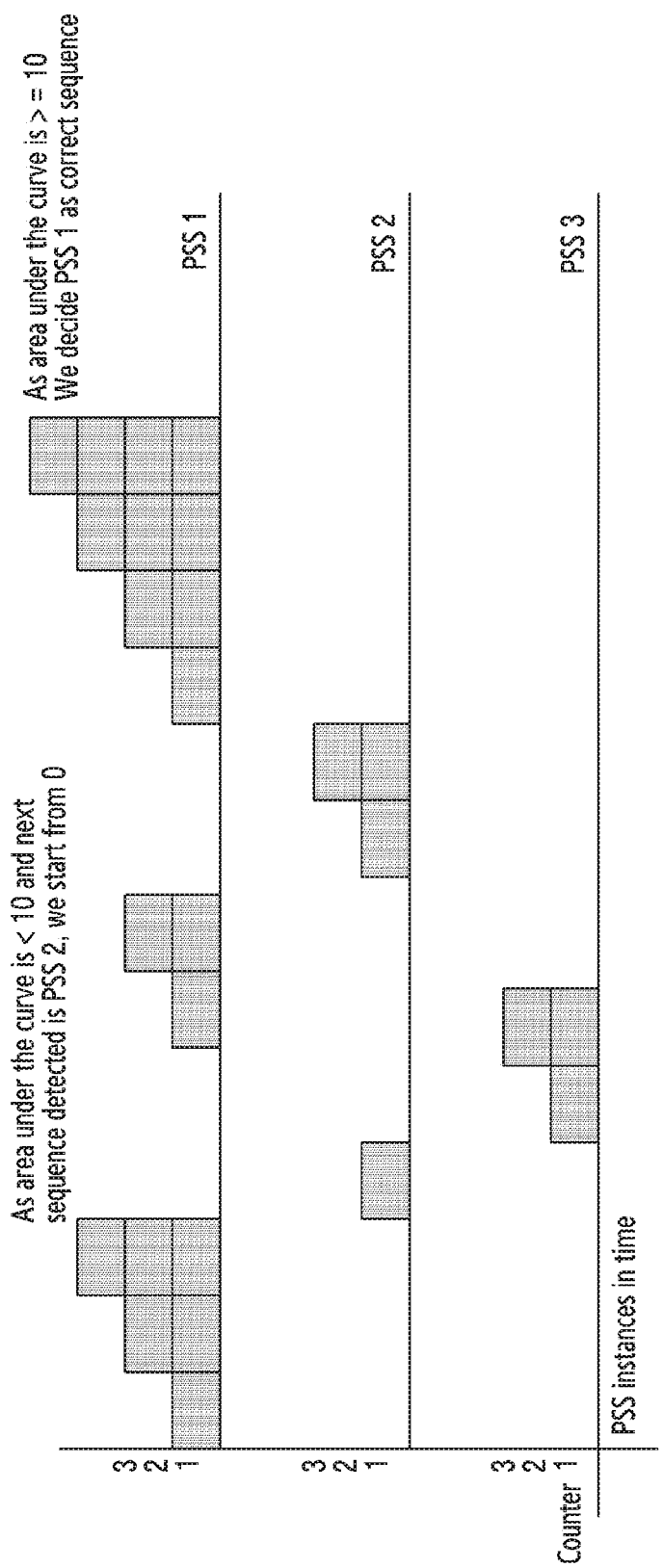

FIGS. 6A-6D are diagrams illustrating the detection of the PSS based on the dynamic rewarding based method, according to an embodiment. Embodiments herein enable the UE 106 to detect the PSS based on the dynamic rewarding based method with reduced time. The UE 106 generates the three locally generated PSS sequences (the NID(0)/PSS1, the NID(1)/PSS2, and the NID(2)/PSS3). For each PSS instance (of 5 ms duration), the UE 106 correlates the decimated samples with each of the three locally generated PSS sequences and updates the count of occurrences of the PSS with respect to each locally generated PSS sequence based on the associated peak values. The count of occurrences of the PSS can be updated for each locally generated PSS sequence based on the rewarding based method. In accordance with the rewarding based method, the UE 106 updates the count of occurrences of the PSS for each locally generated PSS sequence based on its previous state/count of occurrences of the PSS if the sequence of detection of the PSS continues with the corresponding locally generated PSS sequence. If the sequence of detection of the PSS discontinues with the locally generated PSS sequence, then the UE 106 renews the count of the occurrences of the PSS (updating the count as 1) for the corresponding locally generated PSS sequence. After performing the correlation for each PSS instance, the UE 106 checks if the total count of occurrences of the PSS associated with any one of the three locally generated PSS sequences satisfy the counter threshold (for example: 10). If the total count of occurrences of the PSS associated with any one of the three locally generated PSS sequences satisfy the counter threshold (for example: 10), the UE 106 detects the corresponding locally generated PSS sequence as the PSS. When the total count of occurrences of the PSS associated with the PSS1 is greater than the counter threshold 10, the UE 106 considers the PSS1 as the PSS that has been broadcasted by the at least one BS 104 as depicted in FIG. 6A.

Embodiments herein are further described considering the index counters for detecting the count of occurrences of the PSS associated with each locally generated PSS sequence as an example. As illustrated in FIG. 6B, the UE 106 defines three separate index counters (a counter(0), a counter(2), and a counter(3)) for the three locally generated PSS sequences for detecting the associated count of occurrences of the PSS with the three locally generated PSS sequences. For detecting the PSS, at a first PSS instance/time T1 ('t'), the UE 106 correlates decimated samples obtained from the first PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the value of the counter(2) associated with the NID(2) by 1 at time T1(counter(2)=1) and checks if the value of the counter(2) satisfy the counter threshold (for example: 15). The UE 106 proceeds for the detection of the PSS considering the next PSS instance transmitted after 5 ms (i.e. at time T2/second PSS instance (wherein T2='t+5')), since the value of the counter (2) does not satisfy the counter threshold.

At the time T2, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the value of the counter(2) associated with the NID(2) based on the previous value, since the sequence of detection of the PSS continues with respect to the NID(2). The UE 106 can update the counter(2) as counter(2)=1+2 (e.g., using the Fibonacci Series). After performing the correlation at the time T2, the UE 106 identifies that the NID(2) has the highest sequence counter value and checks if the value of the counter(2) satisfies the counter threshold (e.g., 15 When the value of the counter (2) does not satisfy the counter threshold, the UE 106 proceeds to the detection of the PSS considering the next PSS instance transmitted after 5 ms (i.e., at time T3/third PSS instance (wherein T3='t+10')).

At the time T3, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the counter (2) associated with the NID(2) based on the previous value, since the PSS has been observed continuously with respect to the NID(2). The UE 106 can update the counter(2) as counter(2)=1+2+3. The UE 106 identifies that the NID(2) has the highest sequence counter value and checks if the value of the counter(2) satisfies the counter threshold (e.g., 15) after performing the correlation at the time T3. When the value of the counter (2) does not satisfy the counter threshold, the UE 106 proceeds for the detection of the PSS considering the next PSS instance transmitted after 5 ms (i.e., at time T4/fourth PSS instance (wherein T4='t+15')).

At the time T4, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the counter (2) associated with the NID(2) based on the previous value, since the PSS has been observed continuously with respect to the NID(2). The UE 106 can update the counter(2) as counter(2)=1+2+3+4. The UE 106 identifies that the NID(2) has the highest sequence counter value and checks if the value of the counter(2) satisfies the counter threshold (e.g., 15) after performing the correlation at the time T3. When the value of the counter (2) does not satisfy the counter threshold, the UE 106 proceeds to the detection of the PSS considering the next PSS instance transmitted after 5 ms (i.e. at time T5/fifth PSS instance (wherein T5='t+20')).

At the time T5, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(0). Then, the UE 106 updates the counter (0) associated with the NID(0). The UE 106 can update the counter(0) based on the renewal process, since the sequence of observing the PSS with respect to the NID(2) discontinues. The counter(0) can be updated as counter(0)=1. At the time T5, the value of the counter(0) can be 1 and the value of the counter (2) can be 1+2+3+4. The UE 106 identifies that the counter(2) associated with the NID(2) has the highest counter value and checks if the value of the counter(2) satisfies the counter threshold (e.g., 15) after performing the correlation at the time T5. When the value of the counter (2) does not satisfy the counter threshold, the UE 106 proceeds for the detection of the PSS considering the next PSS instance transmitted after 5 ms (i.e. at time T6/sixth PSS instance (wherein T6='t+25')).

At the time T6, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(0). Then, the UE 106 updates the counter (0) associated with the NID(0) based on the previous value, since the PSS has been observed with the NID(0) continuously. The UE 106 can update the counter(0) as counter(0)=1+2. At the time T6, the value of the counter(0) can be 1+2 and the value of the counter (2) can be 1+2+3+4. The UE 106 identifies that the counter(2) associated with the NID(2) has the highest counter value and checks if the value of the counter(2) satisfies the counter threshold (e.g., 15) after performing the correlation at the time T6. When the value of the counter (2) does not satisfy the counter threshold, the UE 106 proceeds for the detection of the PSS considering the next PSS instance transmitted after 5 ms (i.e., at time T7/seventh PSS instance (wherein T7='t+30')).

At the time T7, the UE 106 correlates the decimated samples obtained from the second PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the counter (2) associated with the NID(2) based on the renewal process, since the sequence of observing the PSS with respect to the NID(0) discontinues. The UE 106 can update the counter(2) as counter(2)=1+2+3+4+1. At the time T7, the value of the counter(0) can be 1+2 and the value of the counter (2) can be 1+2+3+4+1. The UE 106 identifies that the counter(2) associated with the NID(2) has the highest counter value and checks if the value of the counter(2) is greater than the counter threshold of 15 at the time T7. Since the value of the counter (2) is not greater than the counter threshold of 15, the UE 106 proceeds to the detection of the PSS considering the next PSS instance transmitted after 5 ms (i.e., at time T8/eighth PSS instance (wherein T8='t+35')).

At the time T8, the UE 106 correlates the decimated samples obtained from the eighth PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the counter (2) associated with the NID(2) based on the previous value, since the sequence of observing the PSS with respect to the NID(2) continues. The UE 106 can update the counter(2) as counter(2)=1+2+3+4+1+2. At the time T8, the value of the counter(0) can be 1+2 and the value of the counter (2) can be 1+2+3+4+1+2. The UE 106 identifies that the counter(2) associated with the NID(2) has the highest counter value and checks if the value of the counter(2) is greater than the counter threshold of 15 at the time T8. Since the value of the counter (2) is not greater than the counter threshold of 15, the UE 106 proceeds to the detection of the PSS considering the next PSS instance transmitted after 5 ms (i.e., at time T9/ninth PSS instance (wherein T9='t+40')).

At the time T9, the UE 106 correlates the decimated samples obtained from the ninth PSS instance with all the three locally generated PSS sequences (the NID(0)/PSS1, the NID(1)/PSS2, and the NID(2)/PSS3) and determines that the PSS has been observed with respect to the NID(2). Then, the UE 106 updates the counter (2) associated with the NID(2) based on the previous value, since the sequence of observing the PSS with respect to the NID(2) continues. The UE 106 can update the counter(2) as counter(2)=1+2+3+4+ 1+2+3. At the time T8, the value of the counter(0) can be 1+2 and the value of the counter (2) can be 1+2+3+4+1+2. The UE 106 identifies that the counter(2) associated with the NID(2) has the highest counter value and checks if the value of the counter(2) is greater than the counter threshold of 15 at the time T9. Since the value of the counter (2) is greater than the counter threshold of 15, the UE 106 detects that the NID(2) is the PSS that has been broadcasted by the at least one BS 104.

Figure 6C:
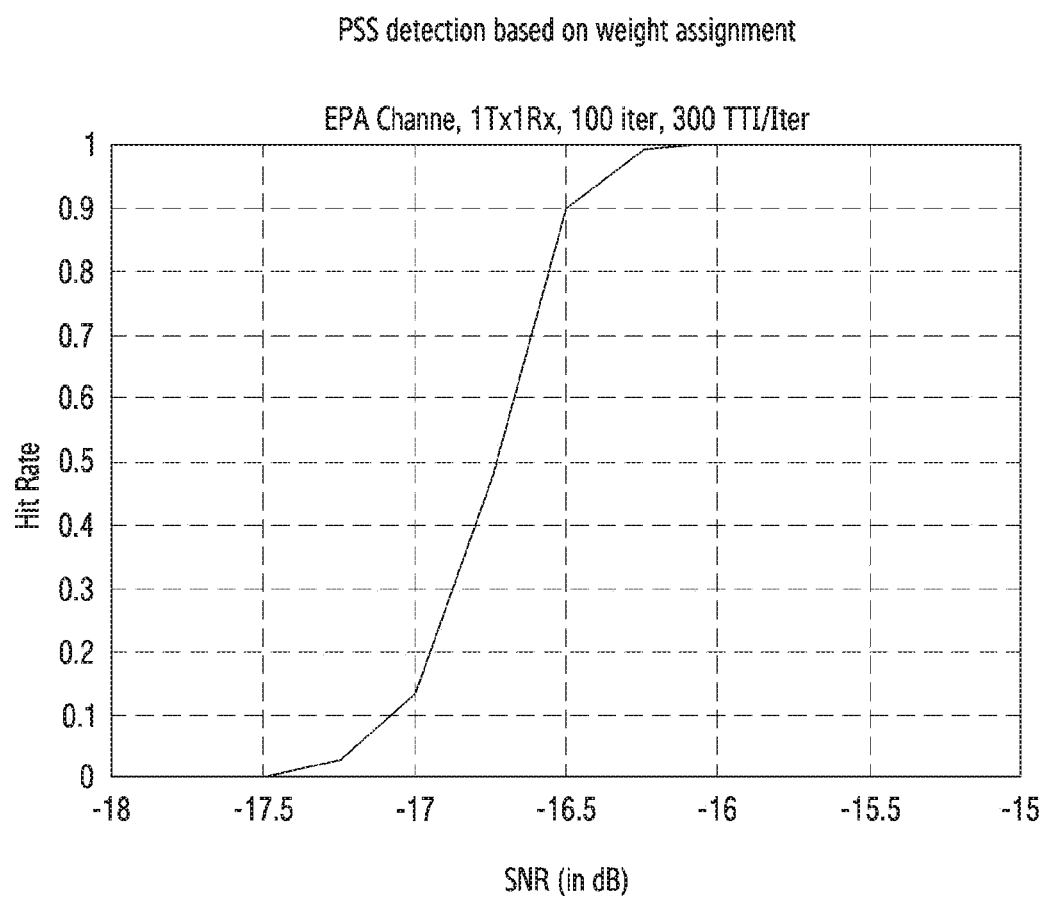

The UE 106 can also detect the PSS at the low SINR using the dynamic rewarding method. The detection of the PSS at the SINR of −16.5 dB with 90% of times is depicted in FIG. 6C as an example.

Figure 6D:
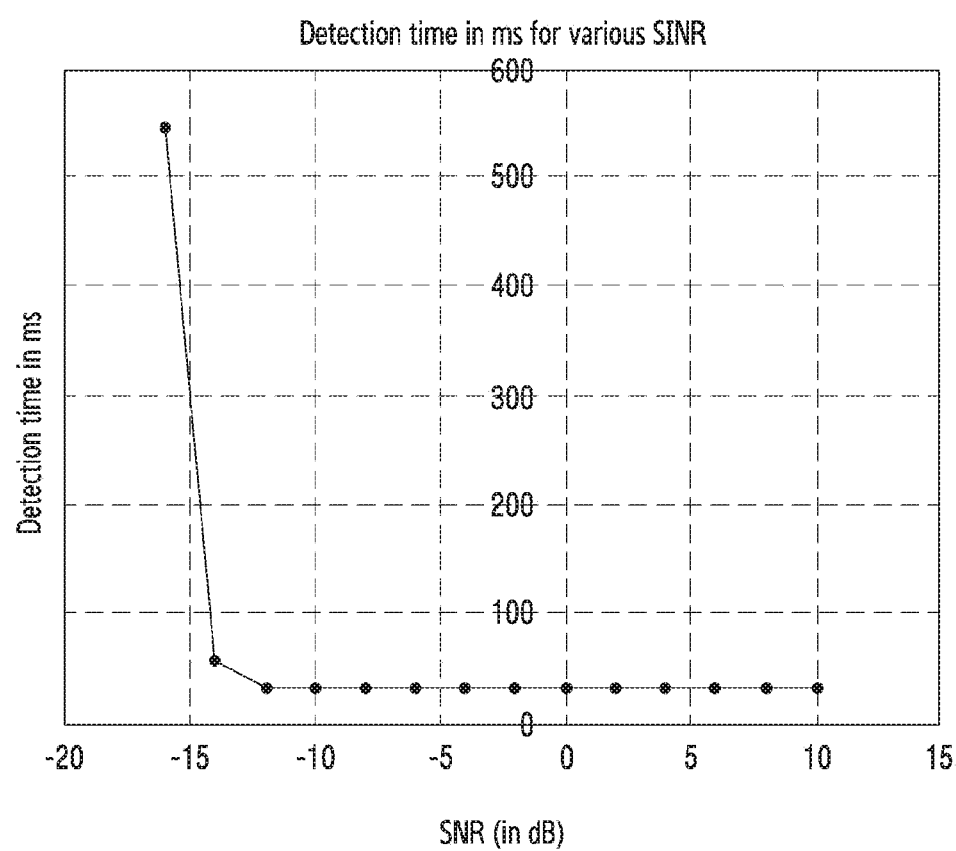

The time consumed by the UE 106 to detect the PSS based on the rewarding method is plotted in an example graph depicted in FIG. 6D. The UE 106 can detect the PSS by consuming 31 ms when the SINR range is greater than or equal to −12 dB. The UE 106 can detect the PSS by consuming 56 ms when the SINR is greater than or equal to −12 dB.

Figure 7:
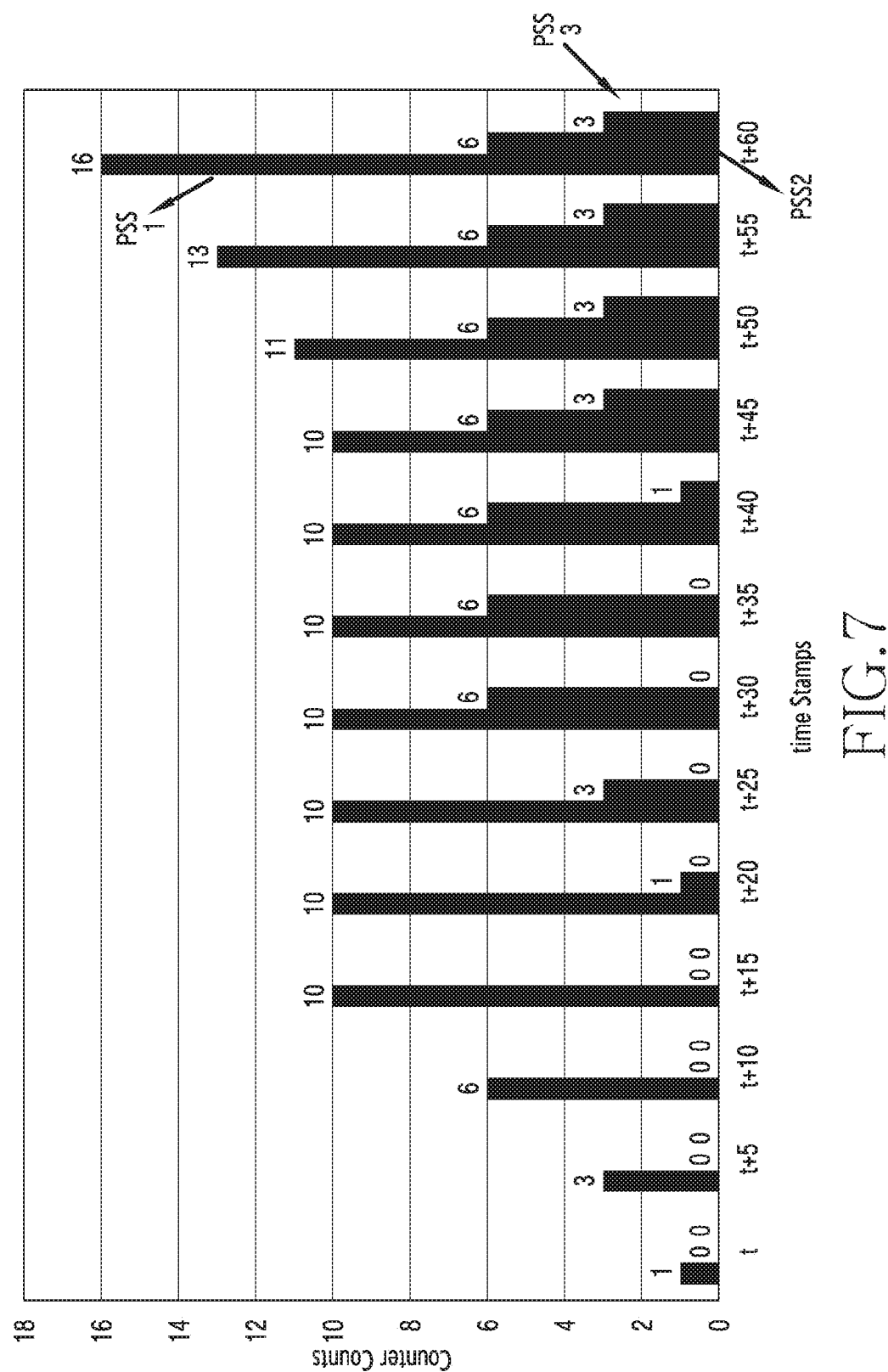
FIG. 7 is a table depicting information about a count of occurrences of the PSS determined for each locally generated PSS sequence based on a dynamic rewarding method, according to an embodiment.

FIG. 7 is a table depicting the assignment of the values for the sequence counters associated with the locally generated based on the dynamic rewarding method during the detection of the PSS, according to an embodiment.

FIG. 8 is an table depicting the time consumed for detecting the PSS based on conventional approaches, the probability detection values, the sliding window method, and the weight assignments, according to an embodiment.

Figure 9:
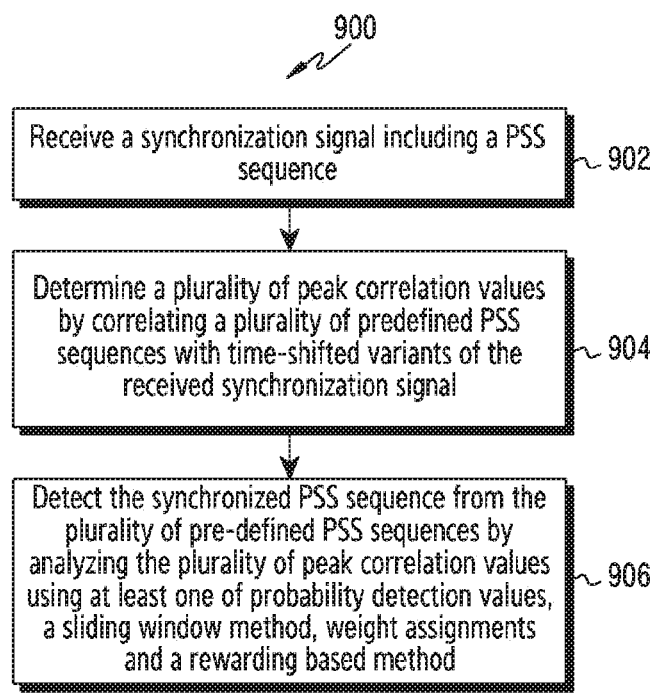
FIG. 9 is a flow diagram illustrating a method for detecting the PSS, according to an embodiment.

FIG. 9 is a flow diagram illustrating a method for detecting the PSS, according to an embodiment.

At step 902 of flow diagram 900, the device receives the synchronization signal including the PSS sequence. The device can be at least one of the UE 106 and the BS 104.

At step 904, the device determines the plurality of peak correlation values by correlating the plurality of pre-defined PSS sequences/locally generated PSS sequences with the time-shifted variants of the received synchronization signal.

At step 906, the device detects the synchronized PSS sequence from the plurality of pre-defined PSS sequences by analyzing the plurality of peak correlation values using at least one of the probability detection values, the sliding window method, the weight assignments, and the rewarding based method.

Figure 10:
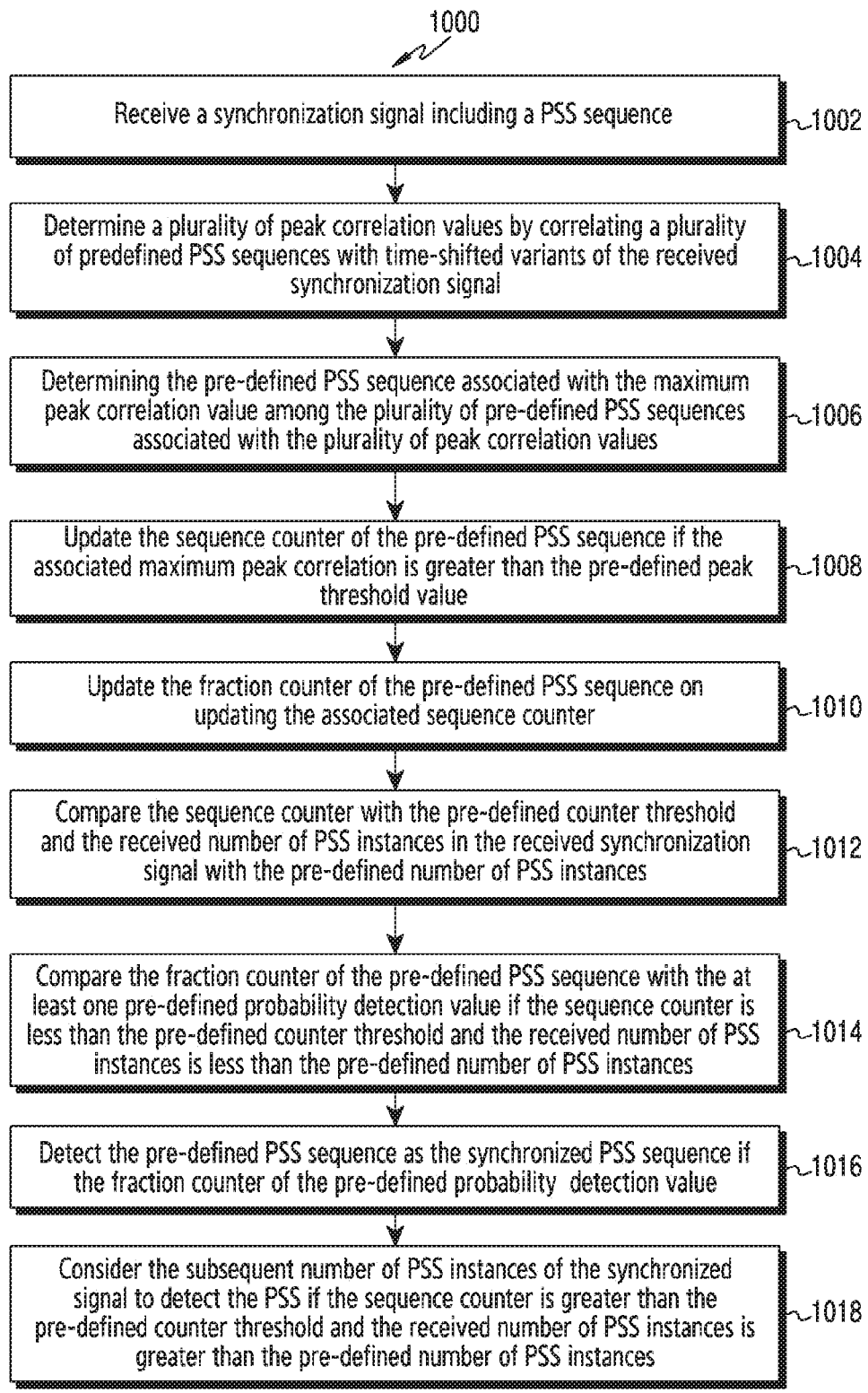
FIG. 10 is a flow diagram illustrating a method for detecting the PSS sequence using probability values, according to an embodiment.

FIG. 10 is a flow diagram illustrating a method for detecting the PSS sequence using the probability values, according to an embodiment.

At step 1002 of flow diagram 1000, the device receives the synchronization signal including the PSS sequence. The device can be at least one of the UE 106 and the BS 104. At step 1004, the device determines the plurality of peak correlation values/peak values by correlating the plurality of pre-defined PSS sequences/locally generated PSS sequences with the time-shifted variants of the received synchronization signal.

At step 1006, the device determines the pre-defined PSS sequence associated with the maximum peak correlation value among the plurality of pre-defined PSS sequences associated with the plurality of peak correlation values. At step 1008, the device updates the sequence counter of the pre-defined PSS sequence if the associated maximum peak correlation is greater than the pre-defined peak threshold value. The sequence counter of the pre-defined PSS sequence represents the number of occurrences of the PSS sequence with respect to the corresponding pre-defined PSS sequence.

At step 1010, the device updates the fraction counter of the pre-defined PSS sequence on updating the associated sequence counter. The fraction counter of the pre-defined PSS sequence represents a frequency of occurrence of the PSS sequence with respect to the corresponding pre-defined PSS sequence. The fraction counter of the pre-defined PSS sequence can be updated by dividing a value of the sequence counter of the corresponding pre-defined PSS sequence using the received number of PSS instances at a current instance of time At step 1012, the device compares the sequence counter with the pre-defined counter threshold and the received number of PSS instances in the received synchronization signal with the pre-defined number of PSS instances. At step 1014, the device compares the fraction counter of the pre-defined PSS sequence with the at least one pre-defined probability detection value if the sequence counter is lesser than the pre-defined counter threshold and the received number of PSS instances is lesser than the pre-defined number of PSS instances. At step 1016, the device detects the pre-defined PSS sequence as the synchronized PSS sequence if the fraction counter of the pre-defined PSS sequence is greater than the pre-defined probability detection value. At step 1018, the device considers the subsequent number of PSS instances of the synchronized signal to detect the PSS if the sequence counter is greater than the pre-defined counter threshold and the received number of PSS instances is greater than the pre-defined number of PSS instances.

Figure 11:
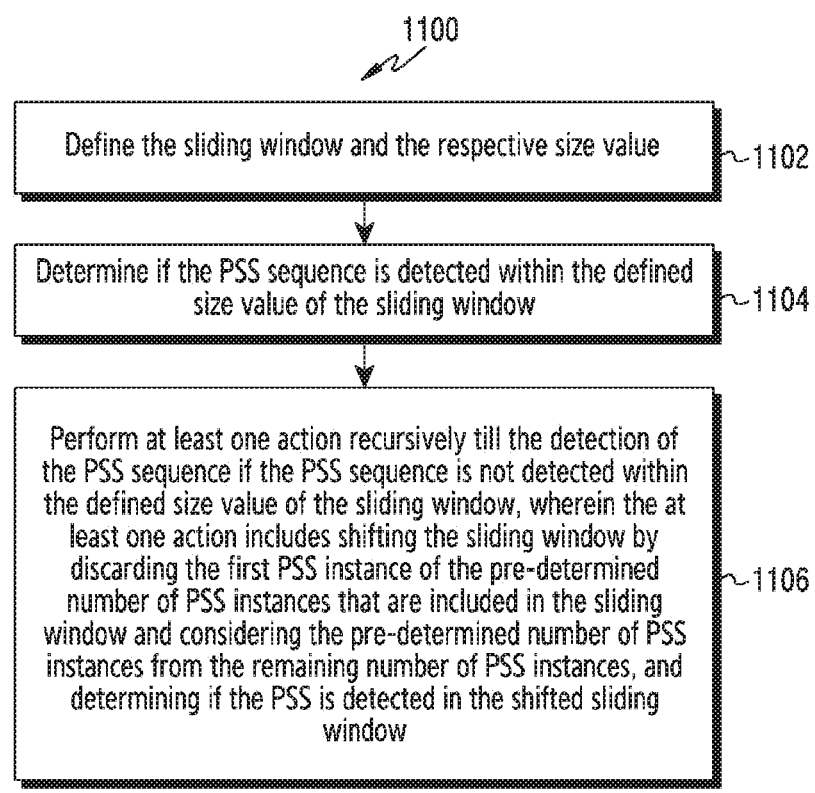
FIG. 11 is a flow diagram illustrating a method for detecting the PSS sequence based on a sliding window, according to an embodiment.

FIG. 11 is a flow diagram illustrating a method for detecting the PSS sequence based on the sliding window, according to an embodiment.

At step 1102 of flow diagram 1100, the device defines the sliding window and the respective size value, where the sliding window is the window including a pre-determined number of PSS instances. At step 1104, the device determines whether the PSS sequence is detected within the defined size value of the sliding window. Within the defined size value of the sliding window, the device determines the plurality of peak correlation values by correlating the plurality of predefined PSS sequences with the time-shifted variants of the received synchronization signal. The device then determines the pre-defined PSS sequence associated with the maximum peak correlation value among the plurality of pre-defined PSS sequences associated with the plurality of peak correlation values. The device updates the sequence counter of the pre-defined PSS sequence if the associated maximum peak correlation value is greater than the predefined peak threshold value. The device then compares the received number of PSS instances with the pre-determined number of PSS instances defined for the sliding window, and compares the sequence counter value of the pre-defined PSS sequence with the pre-defined counter threshold if the received number of PSS instances is lesser than the pre-determined number of PSS instances defined for the sliding window. The device determines that the PSS sequence is detected in the sliding window if the sequence counter of the pre-defined PSS sequence is greater than the predefined counter threshold value, where the corresponding pre-defined PSS sequence is detected as the synchronized PSS. The device determines that the PSS sequence is not detected in the sliding window if the received number of PSS instances is greater than the pre-determined number of PSS instances defined for the sliding window.

At step 1106, at least one action is performed recursively until the detection of the PSS sequence, if the PSS sequence is not detected within the defined size value of the sliding window. The at least one action includes shifting the sliding window by discarding the first PSS instance of the pre-determined number of PSS instances that are included in the sliding window, considering the pre-determined number of PSS instances from the remaining number of PSS instances, and determining if the PSS is detected in the shifted sliding window.

Figure 12:
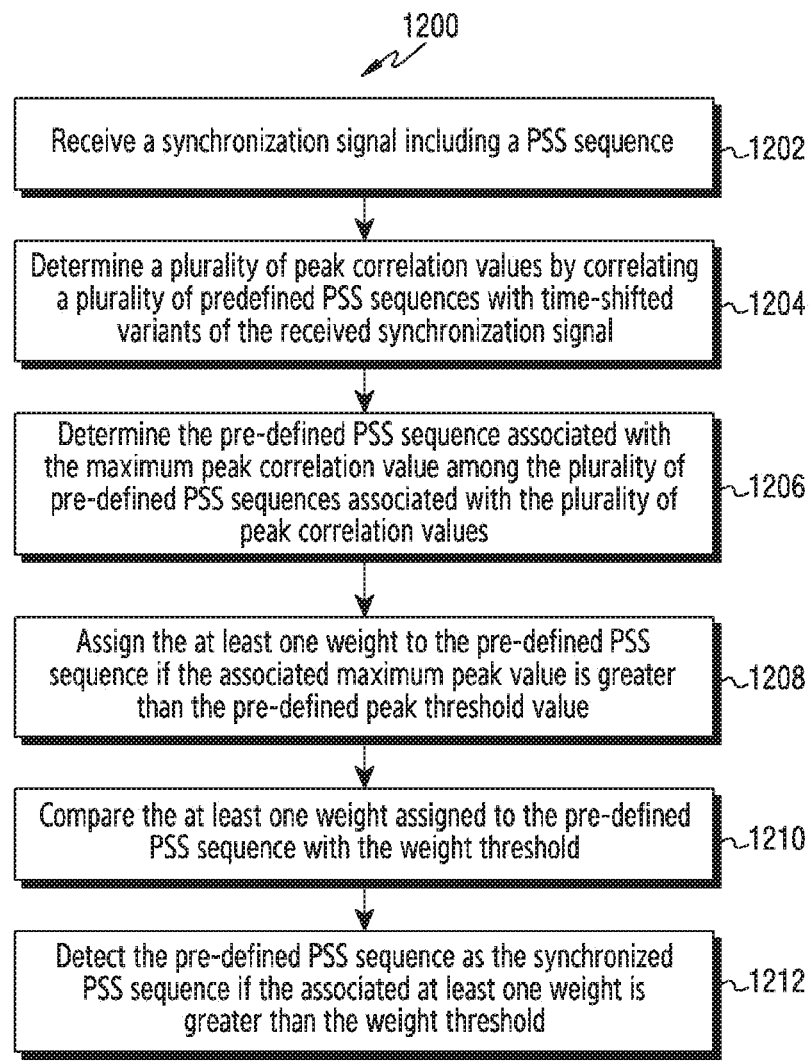
FIG. 12 is a flow diagram illustrating a method for detecting the PSS sequence based on weight assignments, according to an embodiment.

FIG. 12 is a flow diagram illustrating a method for detecting the PSS sequence based on the weight assignments, according to an embodiment of the disclosure.

At step 1202 of flow diagram 1200, the device receives the synchronization signal including the PSS sequence. The device can be at least one of the UE 106 and the BS 104. At step 1204, the device determines the plurality of peak correlation values by correlating the plurality of pre-defined PSS sequences/locally generated PSS sequences with the time-shifted variants of the received synchronization signal.

At step 1206, the device determines the pre-defined PSS sequence associated with the maximum peak correlation value among the plurality of pre-defined PSS sequences associated with the plurality of peak correlation values. At step 1208, the device assigns the at least one weight to the pre-defined PSS sequence if the associated maximum peak value is greater than the pre-defined peak threshold value. The at least one weight can be assigned based on at least one of the plurality of peak threshold values, previous weights assigned to the corresponding pre-defined PSS sequence, and a function of the previous weights assigned to the pre-defined PSS sequence. At step 1210, the device compares the at least one weight assigned to the pre-defined PSS sequence with the weight threshold. At step 1212, the device detects the pre-defined PSS sequence as the synchronized PSS sequence if the associated at least one weight is greater than the weight threshold.

Figure 13:
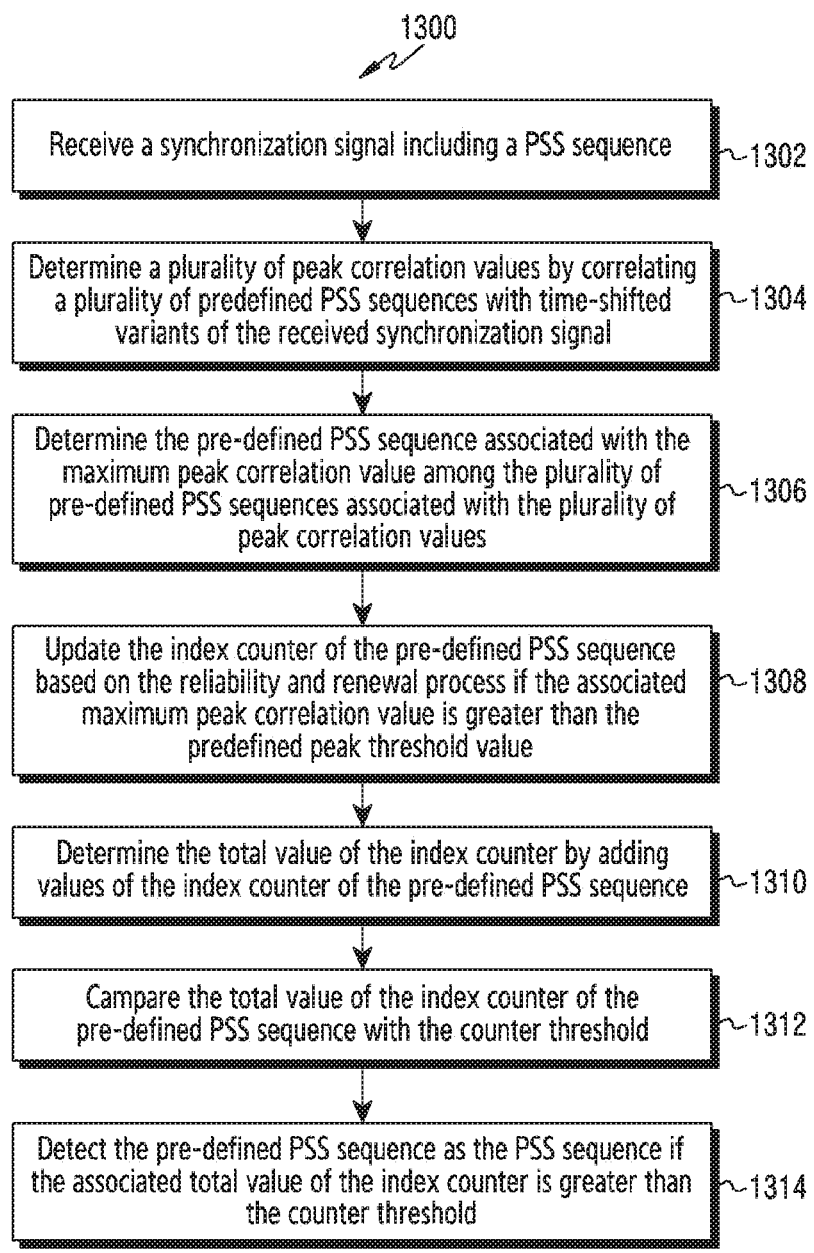
FIG. 13 is a flow diagram illustrating a method for detecting the PSS sequence based on a dynamic rewarding based method, according to an embodiment.

FIG. 13 is a flow diagram illustrating a method for detecting the PSS sequence based on the dynamic rewarding based method, according to an embodiment.

At step 1302 of flow diagram 1300, the device receives the synchronization signal including the PSS sequence. The device can be at least one of the UE 106 and the BS 104. At step 1304, the device determines the plurality of peak correlation values by correlating the plurality of pre-defined PSS sequences/locally generated PSS sequences with the time-shifted variants of the received synchronization signal.

At step 1306, the device determines the pre-defined PSS sequence associated with the maximum peak correlation value among the plurality of pre-defined PSS sequences associated with the plurality of peak correlation values. At step 1308, the index counter of the pre-defined PSS sequence is updated based on the reliability and renewal process, if the associated maximum peak correlation value is greater than the predefined peak threshold value. The index counter of the pre-defined PSS sequence can be updated based on the previous value of the index counter, if the determination of the maximum peak correlation value continues with the corresponding pre-defined PSS sequence. The index counter of the pre-defined PSS sequence can be updated by renewing values of the index counter, if the determination of the maximum peak correlation value discontinues with the corresponding pre-defined PSS sequence.

At step 1310, the device determines the total value of the index counter by adding values of the index counter of the pre-defined PSS sequence. At step 1312, the device compares the total value of the index counter of the pre-defined PSS sequence with the counter threshold. At step 1314, the device detects the pre-defined PSS sequence as the PSS sequence if the associated total value of the index counter is greater than the counter threshold.

Embodiments described herein include methods and systems for faster detection of PSS sequences at low SINRs with high reliability.

Embodiments described herein employ computationally efficient methods for detecting the PSS sequences, which can lead to lightweight implementation (fewer cores) without affecting performance.

Embodiments described herein enable the UE to use at least one method for detecting the PSSs, where the at least one method may be based on mathematical models, such as, but not limited to, probability theory, Markov Decision Theory. Ergodic theory, reliability theory, and real analysis method.

The embodiments described herein can be implemented through at least one software program running on at least one hardware device and performing network management functions to control the elements. The elements shown in FIGS. 1A-3 can be at least one of a hardware device, or a combination of hardware device and software module.

The embodiments described herein include methods and systems for detecting PSS in wireless network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, for example, very high speed integrated circuit hardware description language (VHDL), another programming language, or implemented by one or more VHDL or several software modules being executed on at least one hardware device. The hardware device can be any kind of portable device that can be programmed. The device may also include means which could be hardware means, such as, for example, an ASIC, or a combination of hardware and software means, such as, for example, an ASIC and an FPGA, or at least one microprocessor and at least one memory with software modules located therein. The method embodiments described herein could be implemented partly in hardware and partly in software. Alternatively, the invention may be implemented on different hardware devices using a plurality of CPUs.

The foregoing description of embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to certain embodiments, it will be understood by those skilled in the art that various changes in form and detail may be made therein without departing from the spirit and scope of the invention as defined by the appended claims.

What is claimed is:

1. A method for detecting a synchronized primary synchronization signal (PSS) sequence in a wireless network, the method comprising:
receiving, by a device, a synchronization signal including a PSS sequence;
determining, by the device, a plurality of peak correlation values by correlating a plurality of predefined PSS sequences with time-shifted variants of the received synchronization signal; and
detecting, by the device, the synchronized PSS sequence from the plurality of predefined PSS sequences by analyzing the plurality of peak correlation values using at least one of probability detection values, a sliding window method, weight assignments, and a rewarding-based method,
wherein detecting the synchronized PSS sequence by analyzing the plurality of peak correlation values based on the weight assignments comprises: determining a predefined PSS sequence associated with a maximum peak correlation value among the plurality of predefined PSS sequences associated with the plurality of peak correlation values; assigning at least one weight to the predefined PSS sequence if the associated maximum peak value is greater than a predefined peak threshold value; comparing the at least one weight assigned to the predefined PSS sequence with a weight threshold; and detecting the predefined PSS sequence as the synchronized PSS sequence, if the at least one weight is greater than the weight threshold.

2. The method of claim 1, wherein the device is at least one of a user equipment (UE) and a base station (BS).

3. The method of claim 1, wherein detecting the synchronized PSS sequence by analyzing the plurality of peak correlation values based on the probability detection values comprises:
determining a predefined PSS sequence associated with a maximum peak correlation value among the plurality of predefined PSS sequences associated with the plurality of peak correlation values;
updating a sequence counter of the predefined PSS sequence, if the associated maximum peak correlation is greater than a predefined peak threshold value, wherein the predefined peak threshold value is predefined for each BS based on different frequency operations and different path loss models, and wherein the predefined peak threshold value is predefined with at least one random value, and is dynamically varied based on at least one parameter;
updating a fraction counter of the predefined PSS sequence based on updating the sequence counter;
comparing the sequence counter with a predefined counter threshold and comparing a received number of PSS instances in the received synchronization signal with a predefined number of PSS instances;
comparing the fraction counter with a predefined probability detection value, if the sequence counter is less than the predefined counter threshold and the received number of PSS instances is less than the predefined number of PSS instances; and
detecting the predefined PSS sequence as the synchronized PSS sequence, if the fraction counter is greater than or equal to the predefined probability detection value.

4. The method of claim 3, further comprising:
considering a subsequent number of PSS instances of the synchronized signal to detect the PSS, if the sequence counter is greater than or equal to the predefined counter threshold and the received number of PSS instances is greater than or equal to the predefined number of PSS instances.

5. The method of claim 3, wherein the sequence counter represents a number of occurrences of the PSS sequence with respect to the corresponding predefined PSS sequence.

6. The method of claim 3, wherein the fraction counter represents a frequency of occurrence of the PSS sequence with respect to the corresponding predefined PSS sequence.

7. The method of claim 6, wherein the fraction counter is updated by dividing a value of the sequence counter using the received number of PSS instances at a current instance of time.

8. The method of claim 3, further comprising:
comparing the fraction counter with a predefined plurality of probability detection values for detecting the synchronized PSS sequence.

9. The method of claim 8, wherein the plurality of probability detection values are defined using the at least one parameter and machine learning.

10. The method of claim 9, wherein the at least one parameter comprises at least one of signal to interference plus noise ratio (SINR), noise variance, average interference, UE distribution, quality of service (QoS) requirement, estimated interference, average channel quality index (CQI) information, instantaneous CQI information, availability of resources on the UE, bandwidth, signal to noise ratio (SNR), and performance requirements.

11. The method of claim 1, wherein detecting the synchronized PSS sequence by analyzing the plurality of peak correlation values based on the sliding window method comprises:
defining a sliding window and a respective size value, wherein the sliding window is a window comprising a predefined number of PSS instances;
determining whether the synchronized PSS sequence is detected based on the plurality of peak correlation values within the respective size value of the sliding window; and
performing at least one action recursively until the detection of the synchronized PSS sequence, if the synchronized PSS sequence is not detected within the respective size value of the sliding window, wherein the at least one action comprises:
shifting the sliding window by discarding a first PSS instance of the predefined number of PSS instances that are included in the sliding window, and considering the predefined number of PSS instances from a remaining number of PSS instances; and
determining whether the synchronized PSS sequence is detected in the shifted sliding window.

12. The method of claim 11, wherein determining whether the synchronized PSS sequence is detected within the respective size value of the sliding window comprises:
determining a predefined PSS sequence associated with a maximum peak correlation value among the plurality of predefined PSS sequences associated with the plurality of peak correlation values;
updating a sequence counter value of the predefined PSS sequence, if the associated maximum peak correlation value is greater than a predefined peak threshold value;

comparing a received number of PSS instances with the predefined number of PSS instances for the sliding window;

comparing the sequence counter value with a predefined counter threshold, if the received number of PSS instances is less than the predetermined number of PSS instances for the sliding window;

determining that the synchronized PSS sequence is detected in the sliding window, if the sequence counter is greater than or equal to the predefined counter threshold value, wherein a corresponding predefined PSS sequence is detected as the synchronized PSS sequence; and determining that the synchronized PSS sequence is not detected in the sliding window, if the received number of PSS instances is greater than or equal to the predefined number of PSS instances for the sliding window.

13. The method of claim 11, wherein the size value of the sliding window is defined using at least one parameter and machine learning.

14. The method of claim 1, wherein the at least one weight is assigned based on at least one of the plurality of peak threshold values, previous weights assigned to the predefined PSS sequence, and a function of the previous weights assigned to the predefined PSS sequence.

15. The method of claim 1, wherein detecting the PSS sequence by analyzing the plurality of peak correlation values based on the rewarding-based method comprises:

determining a predefined PSS sequence associated with a maximum peak correlation value among the plurality of pre-defined PSS sequences associated with the plurality of peak correlation values;

updating an index counter of the predefined PSS sequence based on a reliability and renewal process, if the associated maximum peak correlation value is greater than a predefined peak threshold value;

determining a total value of the index counter by adding values of the index counter of the predefined PSS sequence;

comparing the total value of the index counter with a counter threshold; and detecting the predefined PSS sequence as the synchronized PSS sequence, if the total value of the index counter is greater than the counter threshold.

16. The method of claim 15, wherein updating the index counter based on the reliability and renewal process comprises:

updating the index counter based on a previous value of the index counter, if maximum peak correlation value determination continues with the predefined PSS sequence; and updating the index counter by renewing values of the index counter, if the maximum peak correlation value determination discontinues with the predefined PSS sequence.

17. The method of claim 16, wherein the updated value of the index counter is greater than a previous value of the index counter.

18. A device in a wireless network, the device comprising:
a memory;
at least one processor operably coupled to the memory and configured to:
receive a synchronization signal including a PSS sequence;
determine a plurality of peak correlation values by correlating a plurality of predefined PSS sequences with time-shifted variants of the received synchronization signal; and
detect a synchronized PSS sequence from the plurality of predefined PSS sequences by analyzing the plurality of peak correlation values using at least one of probability detection values, a sliding window method, weight assignments, and a rewarding-based method,
wherein detecting the synchronized PSS sequence by analyzing the plurality of peak correlation values based on the weight assignments comprises: determining a predefined PSS sequence associated with a maximum peak correlation value among the plurality of pre-defined PSS sequences associated with the plurality of peak correlation values; assigning at least one weight to the predefined PSS sequence if the associated maximum peak value is greater than a predefined peak threshold value; comparing the at least one weight assigned to the predefined PSS sequence with a weight threshold; and detecting the predefined PSS sequence as the synchronized PSS sequence, if the at least one weight is greater than the weight threshold.

* * * * *